(12) United States Patent
Suchland

(10) Patent No.: US 10,534,525 B1
(45) Date of Patent: Jan. 14, 2020

(54) MEDIA EDITING SYSTEM OPTIMIZED FOR DISTRIBUTED COMPUTING SYSTEMS

(71) Applicant: Amazon Technologies, Inc., Seattle, WA (US)

(72) Inventor: Jonathan Edward Suchland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1166 days.

(21) Appl. No.: 14/565,274

(22) Filed: Dec. 9, 2014

(51) Int. Cl.
| G06F 3/0484 | (2013.01) |
| H04L 29/08 | (2006.01) |
| G06F 3/0481 | (2013.01) |

(52) U.S. Cl.
CPC ........ G06F 3/04847 (2013.01); G06F 3/0481 (2013.01); H04L 67/1097 (2013.01)

(58) Field of Classification Search
CPC . G06F 3/04847; G06F 3/0481; H04L 67/1097
See application file for complete search history.

(56) References Cited

U.S. PATENT DOCUMENTS

| 5,905,841 A * | 5/1999 | Peters ................. G11B 27/028 348/96 |
| 6,229,850 B1 * | 5/2001 | Linzer ................... H04N 19/51 375/240.1 |
| 6,414,725 B1 * | 7/2002 | Clarin .................. G11B 27/034 348/399.1 |
| 7,069,314 B1 * | 6/2006 | Aoki ....................... G06T 11/60 358/1.2 |
| 7,769,270 B2 * | 8/2010 | Nakamura ........... G11B 27/031 386/280 |
| 9,286,706 B1 * | 3/2016 | Krishnaswamy .. G06K 9/00288 |
| 9,569,697 B1 * | 2/2017 | McNerney ........... G06K 9/6267 |
| 2001/0052909 A1 * | 12/2001 | Kumagai ............. G11B 27/031 715/723 |
| 2002/0057894 A1 * | 5/2002 | Ishige .................. G11B 27/031 386/281 |
| 2002/0145622 A1 * | 10/2002 | Kauffman ............ G11B 27/031 715/723 |
| 2003/0088877 A1 * | 5/2003 | Loveman ............. G11B 27/031 725/92 |

(Continued)

FOREIGN PATENT DOCUMENTS

| JP | 2001268505 A | * | 9/2001 |
| JP | 2002-191011 A | * | 7/2002 |

OTHER PUBLICATIONS

Nagai, Machine generated translation of JP 2002-191011, Jul. 2002.*

*Primary Examiner* — David E Harvey
(74) *Attorney, Agent, or Firm* — Davis Wright Tremaine LLP

(57) ABSTRACT

A system and method for performing edit actions on media of a first resolution, wherein the media of the first resolution is obtained from a media capture device and the media of the first resolution is stored in a data store. A set of edit actions is obtained, wherein the set of edit actions were previously applied to media of the second resolution, wherein the media of the second resolution is a lower-resolution copy of the media of the first resolution, and edited media is produced by applying the set of edit actions to the at least a portion of the media of the first resolution.

21 Claims, 9 Drawing Sheets

(56) References Cited

U.S. PATENT DOCUMENTS

| | | | |
|---|---|---|---|
| 2004/0044732 A1* | 3/2004 | Fushiki | G06T 11/60 709/205 |
| 2004/0150663 A1* | 8/2004 | Kim | G06F 16/40 715/723 |
| 2007/0239788 A1* | 10/2007 | Cunningham | G06F 3/04817 |
| 2009/0034933 A1* | 2/2009 | Rich | G11B 27/031 386/288 |
| 2009/0103835 A1* | 4/2009 | Folgner | G06Q 10/10 382/299 |
| 2009/0116732 A1* | 5/2009 | Zhou | H04N 13/139 382/154 |
| 2010/0260468 A1* | 10/2010 | Khatib | G06F 11/0757 386/278 |
| 2011/0206351 A1* | 8/2011 | Givoly | G11B 27/034 386/283 |
| 2011/0311199 A1* | 12/2011 | Fay | G11B 27/034 386/241 |
| 2012/0007890 A1* | 1/2012 | Choi | G06T 11/60 345/635 |
| 2012/0201452 A1* | 8/2012 | Pettigrew | H04N 1/60 382/165 |
| 2012/0209889 A1* | 8/2012 | Agnoli | G11B 27/031 707/803 |
| 2012/0251083 A1* | 10/2012 | Svendsen | H04N 5/76 386/285 |
| 2012/0256941 A1* | 10/2012 | Ballestad | G06K 9/00234 345/589 |
| 2012/0307096 A1* | 12/2012 | Ford | H04N 5/23219 348/222.1 |
| 2013/0162678 A1* | 6/2013 | Harris | G09G 5/00 345/634 |
| 2013/0290557 A1* | 10/2013 | Baratz | H04L 65/60 709/231 |
| 2014/0123041 A1* | 5/2014 | Morse | G11B 27/031 715/765 |
| 2014/0237365 A1* | 8/2014 | Oberbrunner | G11B 27/34 715/722 |
| 2015/0178965 A1* | 6/2015 | Edwin | G06F 3/04845 382/311 |

* cited by examiner

MEDIA EDITING SYSTEM OPTIMIZED FOR DISTRIBUTED COMPUTING SYSTEMS

BACKGROUND

Current image, video, and audio editors require the original media to be resident on the editing device to make high-quality edits. If the editing device does not contain the original high-quality media file, and edits are made to a low-resolution version of the media file, the edits will not be reflected on the original high-quality media file, which results in a loss of fidelity. On the other hand, downloading the original high-resolution media to the editing device to make high-quality edits can be very time-consuming and cumbersome using even fast network connections, let alone using slower network connections typical of most wireless mobile devices.

BRIEF DESCRIPTION OF THE DRAWINGS

Various embodiments in accordance with the present disclosure will be described with reference to the drawings, in which.

DETAILED DESCRIPTION

Figure 1:
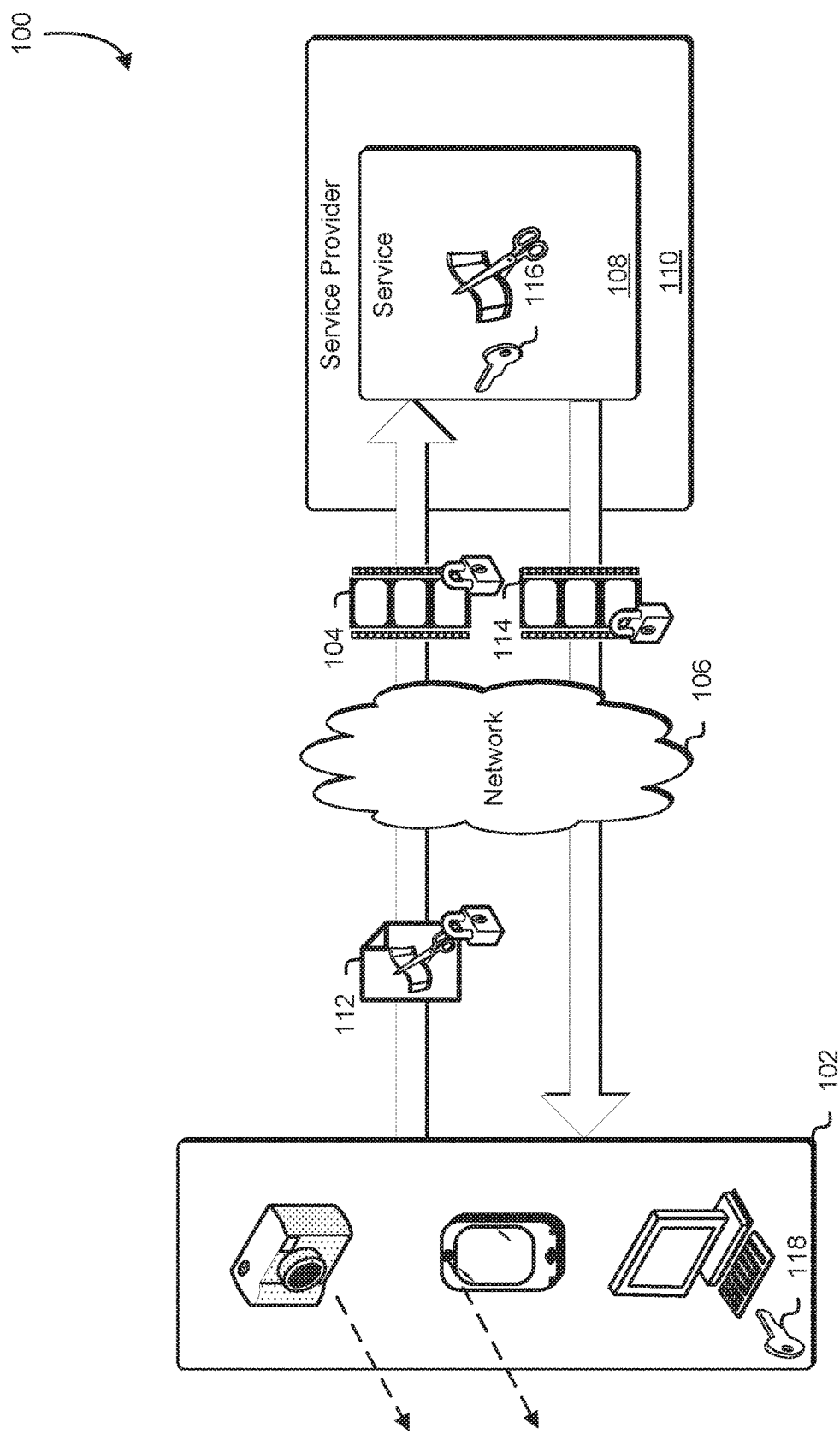
FIG. 1 illustrates an example of an optimized media editor in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for a media editor for editing low-resolution representations of original high-resolution media without a loss of fidelity of the original media. The present disclosure is primarily directed to recording and editing one or more of images, text, video, audio, animation, and interactivity content (e.g., actions performed or experienced by a living individual), collectively referred to as "media," "media content," or "multimedia." A user may capture such media with a client device, and the client device may upload the original captured media through a wired or wireless network to one or more computers of a distributed computing system. In some examples, "client device" may refer to an electronic device designed to, when operated by the user, accept data, perform prescribed mathematical and logical operations, and display the results of these operations. Thereafter, or concurrently, the user may perform edit actions (e.g., crop, filters, text overlays, video transitions, voiceovers, etc.) to a low-resolution copy of the original captured media, and can immediately see how the edit actions affect the low-resolution copy.

In the meantime, the edit actions may also be recorded by the client device and transmitted to the one or more computers of a distributed computing system. The one or more computers of a distributed computing system may be configured then to perform the same edit actions on the original high-resolution media. In this manner, complex edit actions may take advantage of the distributed processing and storage capabilities of a distributed computing system while allowing the edit actions to be recorded and previewed with the client device. This configuration may also provide savings in time and bandwidth. For example, when the user subsequently views the original high-resolution media through a network connection to the distributed computing system, the edit actions on the original high-resolution image/photo may have already been performed without requiring the user to download the original high-resolution media in order to make the edits and re-upload the edited high-resolution media again. In cases where the client device may be running on battery power, processing edit actions on a remote system may prolong the battery life of the client device by avoiding having to perform processor-intensive edit operations on the client device.

In some embodiments, the high-resolution media is captured by the client device simultaneous with the client device streaming the data for the high-resolution media to the distributed computing system. In this manner, the storage capabilities of the client device may not limit the amount of data that can be captured. Rather, the client device may utilize the storage space provided by the computers of the distributed computing system, with the amount of media content that can be recorded only being limited by storage space made available to the client device by the computers of the distributed computing system.

The described and suggested techniques improve the fields of digital photography, video recording, and audio and video editing, by allowing edits of large files to be performed quickly and allowing a media recording device (also referred to as a media capture device) to store large amounts of media without being limited by the native storage capability of the device. In some examples, a "media recording device" or "media capture device" may refer to a client device (defined above) capable of capturing or recording one or more of images, text, video, audio, animation, and interactivity content. Additionally, the described and suggested techniques improve the functioning of media capture devices by providing the capability of performing on-the-fly editing for high-resolution media with an amount of storage that is only limited by the storage made available by a service provider. Moreover, the described and suggested techniques offer meaningful advantages over general image-processing systems by allowing media to be edited on a local device without having to download the original high-resolution files.

FIG. 1 illustrates an aspect of an environment 100 in which an embodiment may be practiced. As illustrated in FIG. 1, the environment 100 may include a client device 102 of a number of possible client devices, including a digital camera, a mobile phone, and a computer system. The client device 102 may securely stream or upload high-resolution captured media 104 through a network 106 to a computing system of a service 108 of a service provider 110. The same or different client device may also, thereafter or in parallel, record a set of edit actions 112 performed on a low-resolution copy of the high-resolution captured media 104. The same or different client device may then securely provide the set of edit actions 112 to the service 108 of the service provider 110, whereupon the service 108 may apply the set of edit actions 112 to the high-resolution captured media 104 to generate edited high-resolution media 114. In some examples, "applying" the set of edit actions may refer to putting the edit actions into effect in the specified media content.

The service provider 110 may provide a variety of services to customers and the customers may communicate with service provider 110 via an interface, which may be a web services interface or any other type of customer interface. Each service, such as the service 108, provided by service provider 110 may have its own interface and subsets of the services may have corresponding individual interfaces in addition to, or as an alternative to, a common interface. A customer may communicate with service provider 110 through the network 106, which may be any suitable communication network, such as the Internet, an intranet, an internet service provider (ISP) network, and/or some other such network as described below.

The service provider 110 may also provide various computing services to its customers individually or as a combination of services of a distributed computer system. The services provided by the service provider 110 may include services such as virtual computer system services, storage services, and/or other such services. Not all embodiments described include all of the services described and additional services may be provided in addition to, or as an alternative to, services explicitly described.

The service provider 110 may provide access to computer systems using a service such as a virtual computer system service that may be a collection of computer resources configured to instantiate a virtual machine instance on behalf of a customer. The customer may interact with the virtual computer system to provision, place, and operate virtual machine instances that are instantiated on physical computer devices hosted and operated by the service provider. The virtual machine instances may be used for various purposes, such as to operate as servers supporting a website, to operate business applications or, generally, to serve as compute power or the customer. Other applications for the virtual machine instances may be to support database applications, electronic commerce applications, business applications, and/or other applications.

The present disclosure describes editing a low-resolution version of the high-resolution captured media 104, and then propagating those edits onto the high-resolution captured media 104 or copy of the high-resolution captured media 104. In some examples, "high-resolution" may refer to media with more information per bit. For example, a high-resolution still image or video may have a higher resolution, higher pixel density, and/or a more complex color profile than a corresponding low-resolution still image or video. A high-resolution video may have, alternatively or additionally, a higher frame rate than a low-resolution video. Similarly, a high-resolution (or high fidelity) audio file may be a file with surround-sound audio, whereas the corresponding low-resolution audio file may be a two-channel audio or mono audio file, and/or may have a lower bit rate than the high-resolution audio file.

The files of high-quality videos, such as high-definition and 4K resolution videos, can be very large. For many video editors, the file being edited must be local to the device editing it, but editing for such large files may be impractical when the editing device has limited processing, storage, memory, and/or power capabilities, such as may be the case for many mobile devices (e.g., cellular phones, tablet computers, handheld cameras, etc.). In some examples, an "editing device" may refer to a client device (defined above) capable of recording edit actions to or capable of performing edit actions on one or more of images, text, video, audio, animation, and interactivity content. In some cases, the editing device may be the same device as the media capture device, whereas in other cases, the editing device may be a different device than the media capture device.

In some cases, the editing functionality provided by the present disclosure may allow for mobile devices with constrained storage, memory, and/or processing power, by utilizing the resources available on remote computing systems of the service 108, to perform comparably to devices with more robust native resources. However, the system of the present disclosure is not limited to mobile devices with constrained resources, but also allows any suitable authorized device to utilize computing services and data storage services of the service provider 110 to remotely edit and store the high-resolution captured media 104 without requiring the high-resolution captured media 104 file to be on the local device. Therefore, the client device 102 may be any electronic device suitable for recording media files, editing media files, and/or uploading media content through a network 106. Examples of such client devices include mobile phones, computers, tablet computers, laptop computers, digital cameras, and camcorders.

In an embodiment, the client device 102, be it a digital camera, video camcorder, or mobile phone with microphone or image sensor configured to capture images and/or video, records the high-resolution captured media 104 and is configured to transfer the high-resolution captured media 104 to data storage in a distributed computing system of a service provider. Examples of the high-resolution captured media 104 and the edited high-resolution media 114 include combinations of one or more of audio, video, still images, text, animation, and interactivity content. Transfer of the high-resolution captured media 104 may occur simultaneous with the recording (e.g., streaming the content to the service provider as it is being recorded) or may be uploaded to the service provider after the high-resolution captured media 104 has been recorded by the client device 102.

In some cases, the high-resolution captured media 104 may be uploaded to the remote computing system of the service 108 through a network 106, such as a cellular or other wireless network or a wired computer network. In some cases, the high-resolution captured media 104 may be captured in a buffer on the client device 102 and automatically streamed to the remote computing system of the service 108. In other cases, some amount of the high-resolution captured media 104 may be temporarily stored on the client device 102 before the high-resolution captured media 104 begins to be streamed to the remote computing system of the service 108. In some other cases, the high-resolution captured media 104 may be captured by the client device 102 as a series of relatively small, discrete files, each of which may be automatically transferred to the remote computing system of the service 108 after the file has been completely written. In still other cases, the high-resolution captured media 104 files may be transferred to an intermediary device, such as a personal computer, which may then upload the high-resolution captured media 104 files to the remote computing system of the service 108.

Note that in many embodiments, the high-resolution captured media 104 and/or the set of edit actions 112 may be uploaded to the remote computing system of the service 108 securely. For example, the high-resolution captured media 104 being uploaded/streamed may be secured by transferring the high-resolution captured media 104 using Secure Socket Layer, Transport Layer Security. Additionally or alternatively, the high-resolution captured media 104 and/or the set of edit actions 112 may be encrypted by the uploading device (i.e., the client device uploading the high-resolution captured media) using a public key of a public-private key pair and decrypted by the remote computing system of the service 108 using the private key 116 of the key pair. Additionally or alternatively, media content, such as the edited high-resolution media 114, the high-resolution captured media 104, or the low-resolution copy of the high-resolution captured media 104, downloaded thereafter from the remote computing system of the service 108 may be encrypted with a public key. The downloaded media may then be decrypted using a corresponding private key 118 residing on the local editing device, thereby ensuring that only devices holding the corresponding private key 118 can view or edit the media. In a similar manner, a low-resolution copy of the high-resolution captured media 104 or the high-resolution captured media 104 may be securely downloaded to either the client device 102 or another computing device in encrypted form and decrypted upon receipt by the receiving device (i.e., the client device authorized to receive the respective media).

By having a low-resolution copy of the high-resolution captured media 104 on the client device 102 or other editing system, the set of edit actions 112 may be performed on the low-resolution copy and recorded while the editing system may be offline. In some examples, "editing system" may refer to a local device that a user utilizes to generate the set of edit actions 112; in some cases this may be the media capture device, while in other cases this may be a separate system, such as a personal computer or laptop system. In some embodiments, the set of edit actions 112 performed on the low-resolution copy may cause the client device 102 or other editing system to generate a low-resolution approximation of the edit actions 112 as they would be applied to the high-resolution captured media 104. In other embodiments, "performing" an edit action on the low-resolution copy may simply include an indication of the edit action being performed without actually applying the edit action to the low-resolution copy. For example, a user may designate that a bokeh effect be applied to the high-resolution captured media by specifying an area on the low-resolution copy for the effect. The low-resolution copy may reflect that edit action with an overlay with the words, "bokeh effect," at the point of field where the bokeh effect is to be calculated from. Thus, the edit action may be reflected on the low-resolution copy in various ways, including a text overlay or by highlighting a region on the low-resolution copy having popup text to describe the edit action (e.g., via mouseover event).

As an example, a user may have a tablet personal computer during an airplane flight that is unconnected to the remote computing system of the service 108 hosting the high-resolution captured media 104, but the tablet personal computer may contain a low-resolution copy of the high-resolution captured media 104 in local storage. The user may perform the set of edit actions 112 to the low-resolution copy with the tablet personal computer, and, when the airplane lands and the user connects to an airport Wi-Fi connection, the edit commands recorded while on the airplane may be uploaded to the remote computing system of the service 108 to be applied to the high-resolution captured media 104 to produce the edited high-resolution media 114. In cases where the editing system may have limited battery power, consigning power-intensive editing tasks to the remote system of the service 108 may provide the benefit of avoiding heat generation and power consumption that would have occurred if the editing system had performed the set of edit actions 112. Likewise, where the editing system has limited processing speed or power, performing the set of edit actions 112 on the low-resolution copy rather than the high-resolution captured media 104 may reduce the burden on the processor of the editing system. An example of processing and the power-intensive set of edit actions 112 may include a zoom-crop edit on a 4K video.

In some cases, multiple people in collaboration may be authorized to make edits to media content. In some of these embodiments, multiple individuals collaboratively capture and edit media. For example, a first individual may be capturing the media and uploading/streaming the media content to a remote computing system while a second individual may be downloading/streaming the content or a low-resolution copy of the content from the remote computing system to perform on-the-fly editing. In this manner, the present disclosure may allow for live or nearly live media editing. In such embodiments, multiple media tracks may be edited at the same time. For example, if two individuals are capturing media and streaming the media content to the remote computing system, a third individual may be downloading the media from the remote computing system to a local computing system to perform editing decisions (e.g., when to cut away to a different camera angle or to composite the two different scenes). In some examples, "streaming" the media content may refer to constant delivery of the media content over time, such that, in many cases, at least portions of the delivered media content may be viewed or edited before all of the media content has been delivered. In some cases, the edits made may then be streamed back to the remote computing system to enable the final product to be viewed in almost real time by other individuals, exported to physical medium, such as a digital video disc, or uploaded to a video-sharing website.

As noted, in some cases, the edit actions may be stored in a separate file than the original high-resolution media. In some cases, the edit actions may be stored as a text file with a list of the edit actions. In this case, when the user may choose to view how the edit actions affect the original high-resolution media, the remote system may stream edited high-resolution media to the user as the remote system applies edit actions to the original high-resolution media, without modifying the original high-resolution media file. Then, if the user chooses to undo or change the edit actions, the edit action file may be updated without affecting the original high-resolution media. In other cases, the edit actions may be applied to the original high-resolution media to generate an edited high-resolution media file stored on the remote system, and when the user chooses to view how the edit actions affect the high-resolution media, the remote system may stream or allow the user to download the edited high-resolution media file. Then, if the user chooses to undo or change the edit actions, the edited high-resolution media file may be regenerated by the remote system.

Figure 2:
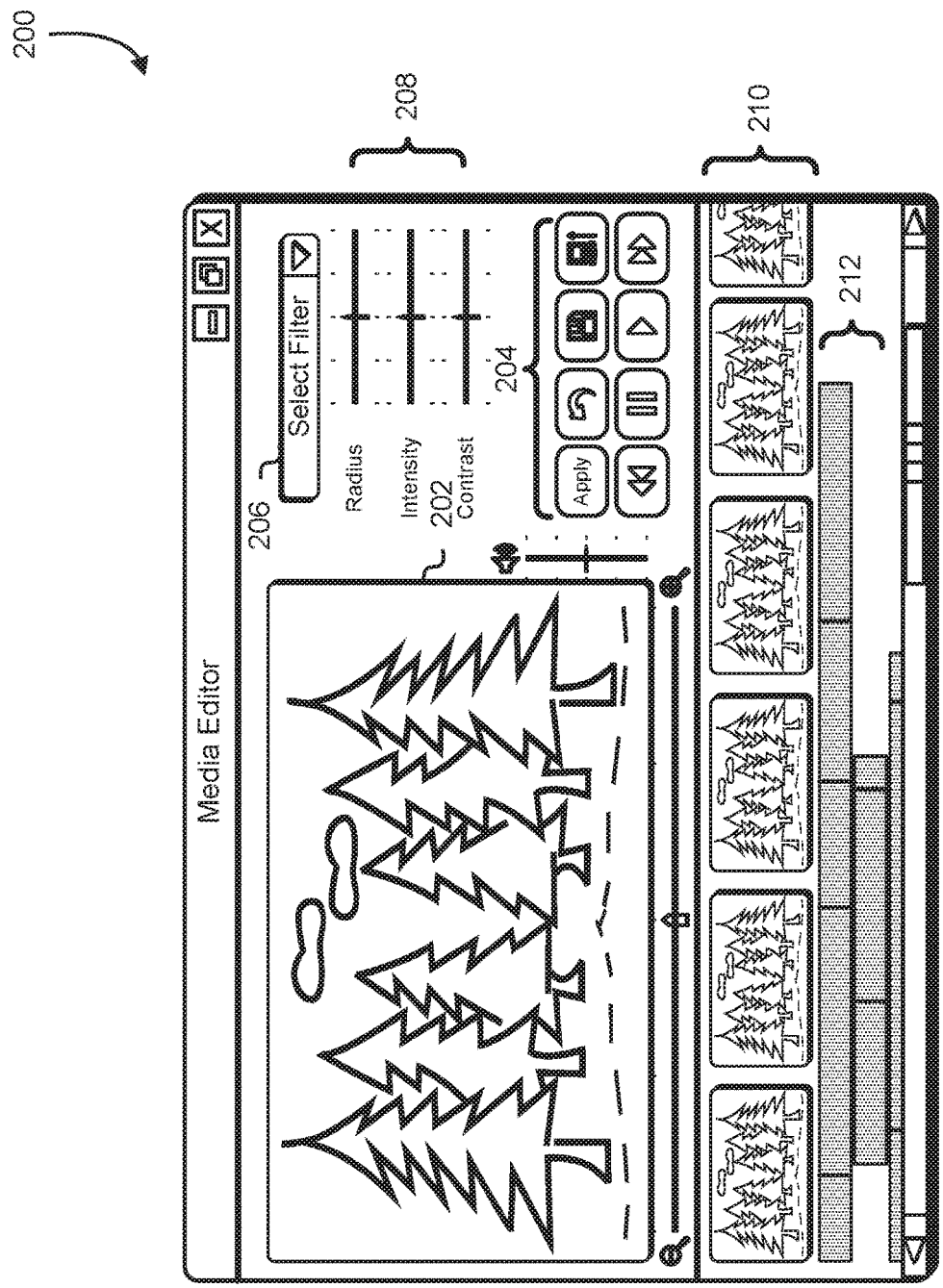
FIG. 2 illustrates an example of an interface of the optimized media editor in accordance with an embodiment.

FIG. 2 illustrates an example of an interface 200 of the type which may be used to perform edit actions on a low-resolution copy of high-resolution media stored on a remote computer system. The interface 200 may execute on any suitable system, including any of the devices described in reference to the client device 102 of FIG. 1. As illustrated in FIG. 2, the interface 200 may include a main view window 202, a set of controls 204, and a set of filters 206. These elements may be used to apply various effects and edit actions to the media being edited. The main view window 202 may also include a set of filter controls 208 for changing the parameters of the filter being applied to the media. If the media being edited is a video, there may be a frame selection ribbon 210 as well as one or more timelines 212. Note that while the interface 200 is depicted in FIG. 2 as suitable for editing video, animation, and/or image media, other types of media, including audio, text, and interactivity content, may be edited according to the present disclosure, and interfaces for these types of media may be may be markedly different than that depicted in FIG. 2. Therefore, the interface 200 should be considered as an example of only one of a variety of possible interfaces.

Once media content is resident on a remote computing system, a user may view or edit the media or low-resolution copy of the media by connecting to the remote computing system, such as by utilizing Hypertext Transfer Protocol progressive download or Real Time Streaming Protocol, to receive the data. In this case, a user interface, such as the interface 200, may be used to manipulate the media content, such as to crop, add text, add or edit an audio track, or apply one or more filters. In some cases, the interface 200 may manipulate a low-resolution version of the media on the media capture device or personal computer and the changes may be applied to the high-resolution file by a command (e.g., clicking an "Upload Edits" button) sent from the interface 200 device to the remote computing system hosting the high-resolution media. The interface 200 for editing media content may be a "what you see is what you get" type of interface, where actions may be applied on a low-resolution version of the media and the user may immediately see how the edit action may affect the media content, such as in the main view window 202. If approved, the editor may then provide the edit actions to the remote computing system to be performed on the original media content.

As noted, the interface 200 may be used to perform edits on a low-resolution copy of the high-resolution media in lieu of performing the edits directly on the high-resolution media. As edit actions are applied by the user, the set of edit actions may be recorded in memory and either uploaded to a remote computer system hosting the high-resolution media for application of the edit actions on the high-resolution media by the remote computer system in concurrence with the edit actions being applied to the low-resolution copy. Alternatively, the recorded set of edit actions may be uploaded at a later date or time to the remote computer system hosting the high-resolution media to be applied to the high-resolution media. This delayed application may be useful when the editing system is out of communication with the remote computing system (e.g., out of Wi-Fi range). Delayed application of edit actions may also be useful in implementations where the user may add, delete, and/or modify edit actions in a set of edit actions, and only have the set of edit actions applied to the original high-resolution media when finally approved by the user.

The main view window 202 may display a current frame or still image of the low-resolution copy of the high-resolution media. As edit actions are selected by the user and applied to the low-resolution copy, the image in the main view window may change to reflect how the image would appear with the edit action applied. In this manner, the user may see how the edit action is likely to affect the high-resolution media without having the high-resolution media file stored on the editing system, and, in some cases, prior to actually applying it to the high-resolution media.

The set of controls 204 may include one or more of clickable graphic controls for (described left-to-right, top-to-bottom as depicted in FIG. 2) applying an edit action to the low-resolution copy, undoing a previous edit action, saving a set of edit actions that have been recorded, uploading and applying the current set of edit actions to the high-resolution media on the remote computing system, rewinding the low-resolution copy, pausing playback of the low-resolution copy, playing the low-resolution copy, and fast-forwarding the low-resolution copy. Note the set of controls 204 are illustrative only, and the interface 200 for editing media of the present disclosure may have more, less, or different controls than that actually depicted in the interface 200.

The set of filters 206, depicted in a dropdown selection control, may list such filters as a Gaussian blur filter, unsharp mask filter, sharpen filter, noise reduction filter, various video special effects (e.g., explosions, lasers, flames, etc.), normalizing audio effects, cut, crop, zoom, and splice. The set of filter controls 208 may be used to further tailor the selected filter of the set of filters 206. The set of filter controls 208 shown in the interface 200 of FIG. 2 are for illustrative purposes only, and may vary based on the particular filter selected from the set of filters 206. Furthermore, although depicted as slider bars, the set of filter controls 208 may be any control suitable to apply the filter control parameter to the image in the main view window 202. For example, instead of slider bars, the set of filter controls 208 may be any combination of icons, radio buttons, checkboxes, dropdown lists, multi-select boxes, or textboxes.

An interface control, such as the frame selection ribbon 210 may depict scenes of a high-resolution video media at various time points. The frame selection ribbon 210 may be used to select one or more scenes for editing in the main view window 202. The timelines 212 may reflect different multimedia sources of the media. For example, a timeline may represent an audio track of the media over time, while another timeline may represent video media. Still another timeline may represent a second video source over time that may be spliced into the first video media. Lines or other indicators may represent key frames, specific times, or a point where one or more filters or other edits have been applied to the particular media source represented by the timeline.

For example, an audio track may be recorded on a local editing system and attached to a video file residing on the remote computing system. In some cases, such an audio track may be uploaded to the remote computing system and the audio track may be accessed or manipulated separately from the video file. Likewise, other audio tracks or other media previously uploaded to the remote computing system may be attached to still other media files. In some cases, media content residing on the remote computing system may be integrated with media from other sites; for example, a user may apply a background soundtrack from an online music store to video content the user uploaded to the remote computing system. These and other editing actions may be controlled through the interface 200 which may cause the actions to be fulfilled by making application programming interface commands to an appropriate service of the service provider hosting the remote computing system.

Note that in some examples the terms "click" and "clicking" are used for illustrative purposes only to present an example where a user manipulates an icon on a screen with a mouse and activates a graphical control by pressing a button on the mouse when the icon hovers over the graphical control. However, it is contemplated that other input methods and other interfaces are possible, and that users may exercise control over the devices and interfaces in the present disclosure in a variety of other ways, including tapping, gesturing, sliding, tilting, pressing, pinching, blinking, and depressing.

Edit actions may be recorded on the local system. In some cases, the edit actions may be communicated to the remote computing system as they are applied to a local copy of the remotely stored media. In other cases, a series (e.g., set) of edit actions may be recorded and modified and only communicated to the remote computing system when a user indicates that they are to be applied to the remotely stored media. As another case, such as when an editing device is temporarily disconnected from a network and unable to access the remotely-stored media, editing actions may be recorded and stored in a file or other record and may be transmitted to the remote computing system at a later time when network communication is reestablished. Examples of edit actions include changing the color space, performing airbrush edits, and adding or editing audio tracks.

As an example, a user may have high-resolution media content on a remote system and a low-resolution copy of the media on an editing system. In this example, the user may want to simulate a bokeh effect such that an area of the background appears blurred based at least in part on an approximate depth of objects in the background. To perform the simulation, the system may apply a Gaussian blur, with a variable radius depending on an estimated depth of objects in the background, around an area specified by the user. The Gaussian blur may be applied to the low-resolution copy and, if approved by the user, may be applied to the high-resolution content by the remote system.

As a step in applying the edit action to the high-resolution media content, the remote system may compute another set of edit actions, translated from the set of edit actions performed on the low-resolution copy of the media, as would be applied to the high-resolution media content. For example, locations specified on the low-resolution copy for performing the edit actions may be remapped in the set of translated edit actions to corresponding locations in the high-resolution media. Likewise, various other parameters, such as a radius of a bokeh effect or other filter, may be passed to an algorithm to generate a set of translated edit actions for the high-resolution media content. In some implementations, translating the set of edit actions is performed by the remote system. In other implementations, the capture device or other editing system may have information (e.g., resolution or frame rate) sufficient for an algorithm to translate the set of edit actions into a set edit actions appropriate for the high-resolution media, and the capture device or other editing system may be perform the translation before uploading the edit action to the remote system.

In some embodiments, the original media content is stored on the remote computing system along with an edit action list. That is, in some implementations, the edit action list may not be applied until the edited media content is actually requested. In the case where the edited media content is never requested, edit action list will not be applied. In this manner, memory, processing, and other resources of the remote computing system may be conserved by only applying the edit actions to the original media content when necessary.

Furthermore, in some implementations, the original media content may remain unmodified, but the edit actions may be applied "on-the-fly" to the media as it is streamed from the remote computing system. In other words, the system may be configured to apply the edit actions in the list to the streamed media. In a hybrid embodiment, the edit action list may not be applied until the edited media content is actually requested, and when such edited media content is actually requested, one or more files of edited media content may be created for download to the requestor. In this manner, the previous two implementations allow an authorized user to add, delete, or modify the edit actions in the edit action list at any time without changing the original media file. The effect being that viewing users may view the media without realizing that the latest edit actions are being applied to the original media content on-the-fly. For example, a black-and-white home movie may be digitized and uploaded to the remote computing system, and an edit action list may be configured to apply colorizing effects to the original black-and-white content whenever it is viewed, such as on an internet TV, or exported, such as to a video-sharing website. Thereafter, if different or better colorizing effects are desirable, they may be applied to the original black-and-white content simply by modifying the edit action list. In some cases there may be multiple edit action lists, which may be applied to different portions of the media content or to the entire media content.

In some embodiments, high-resolution edits can still be performed if an editing system is offline or otherwise not in communication with the remote system. For example, a user may be editing a still image on an offline tablet and may wish to draw a high-resolution line around a face in the still image. The user may zoom in on a face in the still image, and, because the tablet has a low-resolution copy of the still image, the zoomed-in image may be pixelated. However, the system of the present disclosure may allow the user to draw a high-resolution line around the pixelated face. Then, when the tablet connects and uploads the edit action of the line drawn around the face to the remote system, the remote system may apply the high-resolution line to the high-resolution still image resident on the remote system.

In some cases, the user may be allowed to tag one or more edit actions to require confirmation before being fully applied to the high-resolution media. Using the above example where the user draws a high-resolution line around a pixelated low-resolution face, the user may tag the edit actions as requiring further review upon connection with the remote system. Then, when the tablet connects to the remote system, the remote system may download a copy of the high-resolution image as it would appear with the offline edits applied (i.e., "pending edited media"), and the system may prompt the user to approve, modify, or reject the offline edits. In some cases, the remote system may provide the user with "before" and "after" high-resolution media (i.e., representing media before the edit actions are applied and representing how the media would be affected after the edit actions would be applied).

Figure 3:
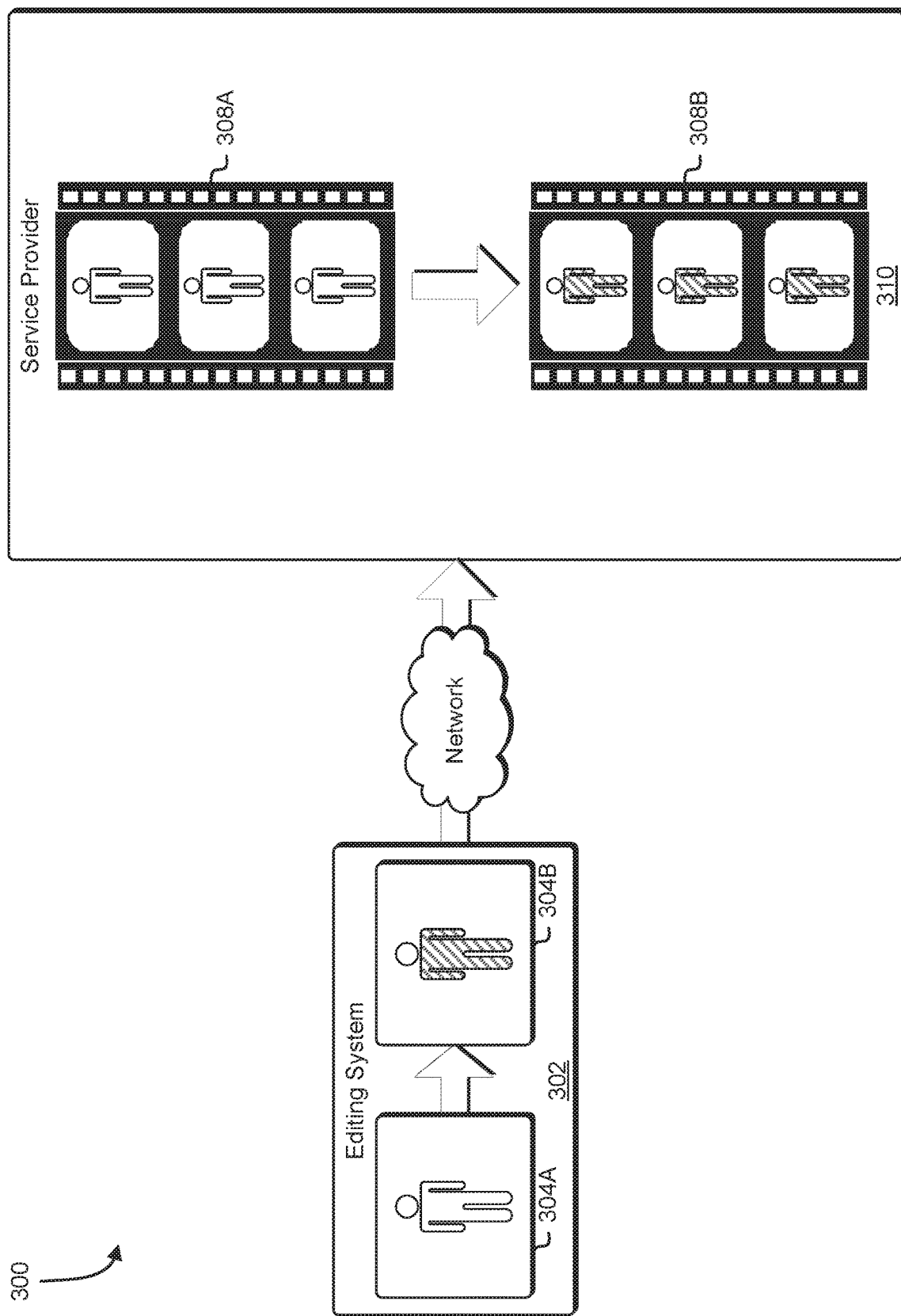
FIG. 3 illustrates an example of seeding an edit action in accordance with an embodiment.

FIG. 3 illustrates an example embodiment 300 of the present disclosure. In some embodiments, remote edits are seeded with an edit performed on a low-resolution copy on the client device. For example, a user could perform red-eye correction edits on a low-resolution copy of the media, and upload the edit actions to a remote computing system hosting the original media content with further instructions to perform the same types of edits on similar areas in the media. In some examples, a "remote computing system" may refer to one or more computing devices in a distributed computing system of a service provider 310 hosting original media 308A, and may include virtual machine instances, data storage and/or data processing capabilities. Specifically, FIG. 3 depicts seeding a copy of media on an editing system 302 with a particular edit action, and having that edit action propagated to the original media 308A residing on the remote computing system of the service provider 310. The editing system 302 may be any device suitable for editing the media in question, including any of the client devices described in connection with the client device 102 of FIG. 1. In the example embodiment 300, an edit, such as a change to the color of clothing, can be applied to a frame 304A of a low-resolution video file resident on the editing system.

A user may be able to review the effect of the edit by reviewing an edited frame 304B of the low-resolution video file. Once approved by the user, the editing system may upload the edit action as an edit seed to the service provider 310. In this example, an "edit seed" may refer to an edit action applied to one portion of media content that may be propagated to similar areas of the media content. The system may determine that areas in the media content are similar to the edit seed by comparing properties of the edit seed with other areas in the media content having similar (e.g., values within a threshold range of) properties. Examples of properties and characteristics in this context include the size, shape, brightness, and/or range of colors of the area of the edit seed, relative location of the area of the edit seed within the media, and frequency of sound in the media.

In some embodiments, edit actions may be recorded by the editing device that have no perceptible effect on the low-resolution copy but will cause a perceptible effect to the high-resolution media when applied. As an example, a user may be performing an edit action to a low-resolution image that has a smaller color range (e.g., 16-bit color) than the original high-resolution image (e.g., 24-bit color). If the user moves a slider control in an editing interface a slight amount, the slight movement of the slider control may have no color-changing effect on the low-resolution image due to the limited color palette of the low-resolution image. However, the slight movement of the color control may have some effect on the high-resolution image due to the larger color palette of the high-resolution image. Thus, edit actions in some embodiments need not be limited by loss of detail (e.g., smaller color palette) in the low-resolution copy.

In some of these embodiments, the editing device may be able to display (or play) higher-resolution media than the low-resolution copy that is stored on the device, and may further be able to display (or play) higher-resolution edits applied to the low-resolution copy than the format the low-resolution copy actually supports. As an example, the low-resolution copy may a 16-bit color image stored on an editing device that is capable of displaying 24-bit images. In this example, the editing device may be able to record 24-bit color edit actions received from a user, and, using the low-resolution copy as a base image, apply the edit actions and display the result as a 24-bit color image. In some of these embodiments, the edit actions may be uploaded to the remote computing system and a new low-resolution copy may be generated and downloaded. In other of these embodiments, the editing device may convert the 24-bit edit actions to 16-bit edit actions and apply the 16-bit edit actions to the locally-stored low-resolution copy (e.g., pixels may be averaged, or follow some other conversion criteria to approximate the 24-bit edit actions).

As another example of this embodiment, a selection area may be drawn around a region on a low-resolution image, and an effect, such as a color transformation, may be performed within the region. However, if the points defining the boundary of the selection area are mapped one-to-one on the corresponding high-resolution image without any line smoothing, application of the effect to the high-resolution image could result in a coarse "pixelated" appearance. Thus, the present disclosure contemplates that recorded edit actions may be subjected to certain transformations, by either the editing device or the remote computing device, to account for differences in between the resolution of the recorded edit actions and the resolution of the high resolution media. Using the example of the selected area, the selection boundary area on the high-resolution image may be determined by first mapping the points defining selection area on the low-resolution to points on the corresponding high-resolution image and then passing the points through a line-smoothing algorithm, a boundary detection algorithm, or some other function for approximating the boundary region on the high-resolution image.

For example, a user might perform red-eye correction to one eye of a person in a still image. Then, the same red-eye correction may automatically be applied by the system to other eyes it detects in the still image as having properties or characteristics (e.g., reddish color, rounded shape, position in photo, relative position to another eye, etc.) similar to the corrected eye before being corrected. In the example embodiment 300, the edit action causing a change to the color of clothing (e.g., from red to blue, color to black-and-white, etc.) of a frame to a low-resolution video may be sent to the service provider 310 along with an instruction to change the color of the same shirt in all other frames of the original media 308A. As can be seen, the edit seed is then propagated, or interpolated, by the service provider 310 to multiple frames of the edited media 308B such that the corresponding clothing, where identified in each frame, may be changed to reflect the color specified by the edit seed.

As another example, an edit seed may be applied to an audio portion of a video. For example, an edit seed may be applied to a voice of a character in the video to alter or enhance the character's voice (e.g., raise or lower the pitch of the voice, add an echo, etc.). That edit seed may be subsequently applied to the same voice, where detected, throughout the video. As has been noted, in some cases, the edit action may be performed on the low-resolution copy as an approximation of the effect as it would be applied to the high-resolution media (e.g., changing the clothing from red to blue). However, in other cases, the low-resolution copy may only provide an indication of the edit action in the edited region on the low-resolution copy (e.g., a text overlay that states "red to blue," text note at the bottom of the display stating that specified area will be rendered in black-and-white, etc.).

In some embodiments, edit actions are queued to automatically be applied to media as it is uploaded to the remote computing system. For example, a user may indicate, such as through a user interface on the media capture device, that a Gaussian blur should be applied to current and future captures by the media capture device to all areas or only certain portions of the captured media. As another example, a user may be capturing or intend to capture video under low-light conditions, and may instruct the remote computing system to automatically apply a specified amount of gamma correction to the video data as it is uploaded to the remote computing system. As noted, in some examples, the edit action may be recorded separately from the original media file such that the user may undo the effect or adjust it further without modifying the original media file.

Figure 4:
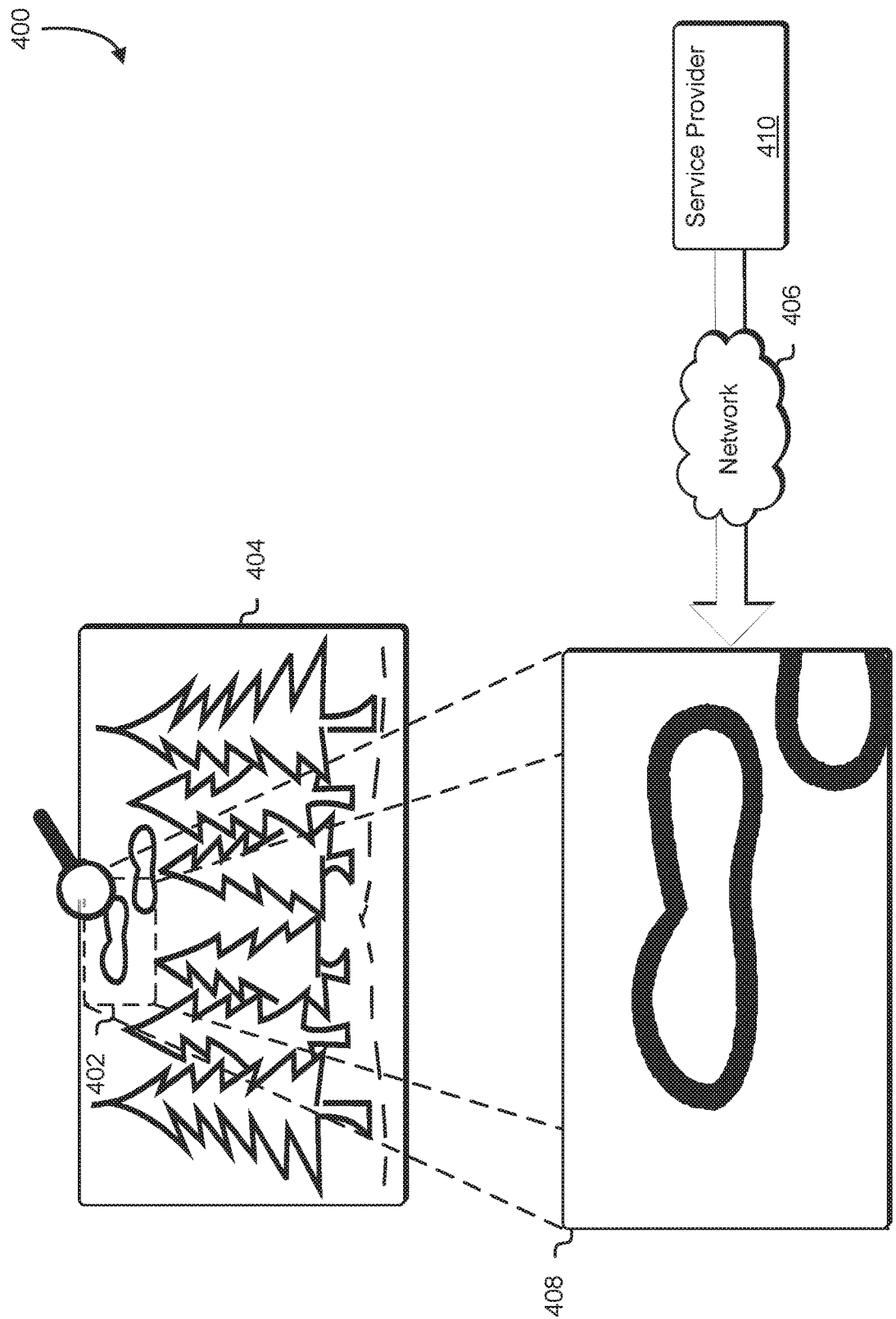
FIG. 4 illustrates an example of obtaining a high-resolution portion of media for local editing in accordance with an embodiment.

FIG. 4 illustrates an example 400 of the effect of zooming into a select area 402 of a low-resolution copy 404 to view the select area 402 in greater detail and/or perform edits in a zoomed area 408. Certain edit actions may cause a portion of the high-resolution media to be downloaded to the editing system as needed. For example, a user may wish to zoom in and view detail of some part of an image. In such cases, because the detail may be lost in the low-resolution copy 404 of the image when it is enlarged, the remote computer system of the service provider 410 may provide the editing system with a copy of higher-resolution media than the low-resolution copy. In some cases, the copy of higher-resolution media may be a copy of a portion of the high-resolution media and have the same fidelity. In other cases, the higher-resolution media may be of lower fidelity than the corresponding portion of the high-resolution media but still be of higher fidelity than a corresponding portion of the low-resolution copy. In some examples, "fidelity" may refer to the degree of accuracy with which media is recorded or reproduced.

For example, if editing an image or a frame of a video, such as the low-resolution copy 404 shown in FIG. 4, the user may select the select area 402 to zoom into to view in greater detail. In the example 400 shown in FIG. 4, rather than expanding the select area 402, which may result in a pixelated image, the service provider 410 may provide an image having a higher pixel density than had the select area 402 just been expanded through the network 406 to be displayed as the zoomed area 408. Similarly, if a user wishes to view or edit the detail of a video frame, the service provider 410 may provide the editing system with a high-resolution video frame from the high-resolution video upon which to perform the edit actions (i.e., without having to provide the entire high-resolution video). For example, if a user editing a video on a tablet has applied a color adjustment to the low-resolution copy of the video and wishes to inspect how that color adjustment may affect a face of a person in the image, the user may pinch-zoom on the person's face. In response, the service provider 410 may provide the high-resolution frame to the tablet, and the tablet may then apply the color adjustment to the high-resolution frame and zoom in to the person's face so that the user may view the result of the edit action. In some embodiments, the service provider 410 provides a subset of frames (e.g., 10 seconds of frames), rather than a single frame and rather than the entire video. In this way, the user may be able to see how an edit action may affect the high-resolution video as it plays without having to download the entire high-resolution video.

Additionally or alternatively, in some cases a slice of the full resolution edit may be downloaded/provided to the editing system for review by the user. For example, a user may apply a red-eye correction effect to low-resolution copy of a still image or video frame, upload the edit action, and, after applying the effect to the high-resolution image or video, the service provider 410 may push the high-resolution edit to the user for approval. In some cases, the service of the service provider 410 may be configured to identify other portions of the high-resolution media that may benefit from the edit action performed on a different portion, and may prompt whether the user would like to apply the edit action to other portions of the media. For example, the service of the service provider 410 may detect other faces in the aforementioned still image and prompt the user to confirm or deny applying red-eye connection to the other detected faces in the image. Likewise, in the aforementioned video, if the service of the service provider 410 detects faces elsewhere in the video, the service provider 410 may prompt the user through an interface, such as the interface 200 of FIG. 2, whether to apply red-eye correction to those other faces in the other portions of the video.

Note that it is contemplated, as throughout the present disclosure, that the concept of downloading a higher-resolution portion of the media content may apply to various types of media besides visual media. For example, if the media is multi-channel audio, the center channel of the audio may be selected for edit via the editing device, the portion of the center channel audio may be streamed/downloaded from the remote system for editing. In this manner, a client device only having one or two speakers may be used to edit multi-channel audio.

Figure 5:
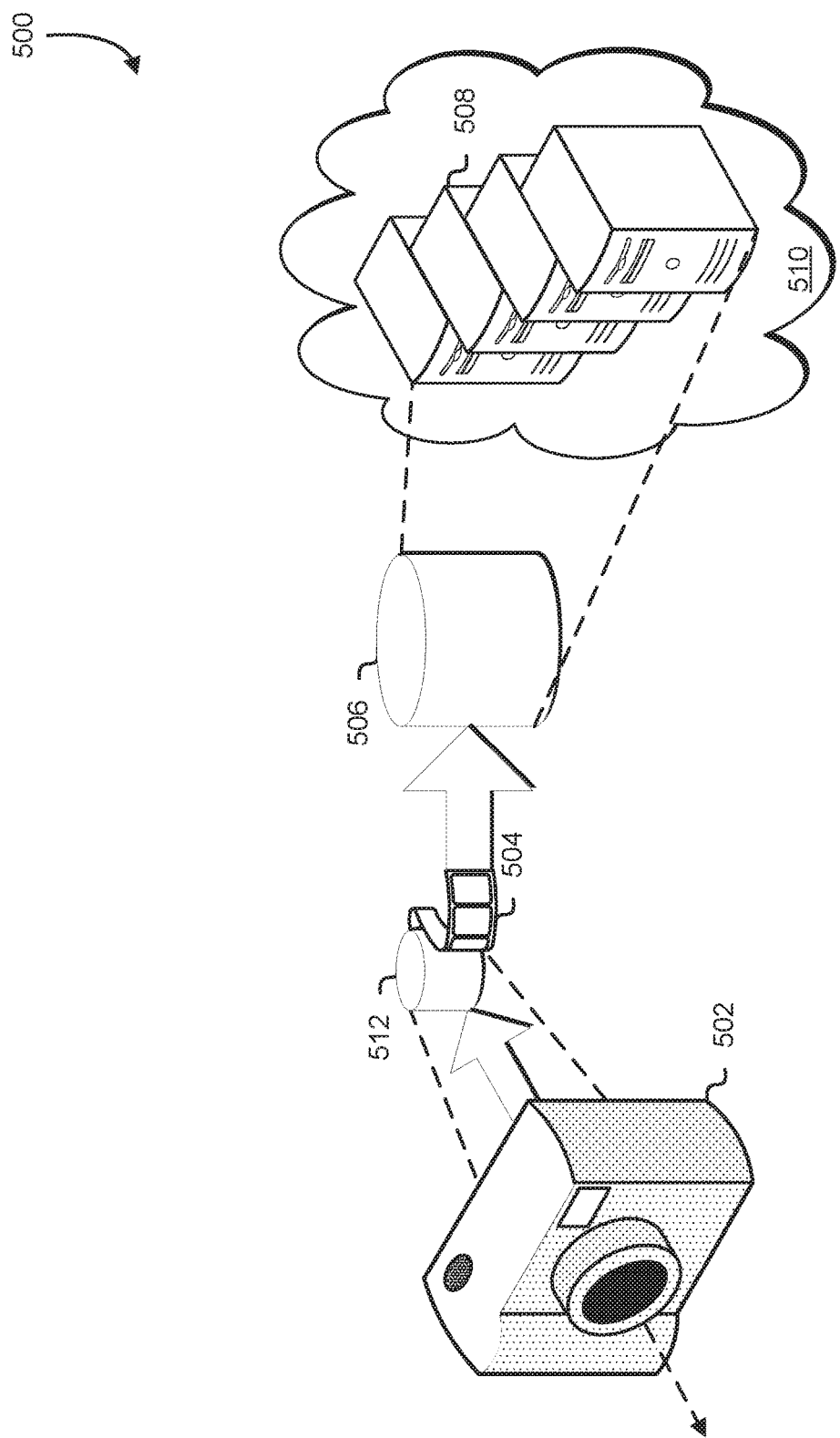
FIG. 5 illustrates an example of streaming media to a distributed computing system concurrent with capture in accordance with an embodiment.

FIG. 5 illustrates an example embodiment 500 of the present disclosure. Specifically, FIG. 5. depicts a media capture device 502 uploading some high-resolution content 504 to a remote storage resource 506 of a distributed system 508 of a service provider 510 concurrently with capturing the media. The media capture device 502 may be any device suitable for capturing media, including a digital camera, a digital camcorder, or a mobile phone with video or audio recording capabilities. The media capture device 502 may have a limited amount of on-board storage 512, and, as shown, the high-resolution content 504 may be briefly buffered on the on-board storage 512 before it is offloaded to the remote storage resource 506, such as through a Wi-Fi network connection to the distributed system 508.

In some cases, the media capture device 502 may capture and transfer the high-resolution content 504 to the remote storage resource 506 while simultaneously capturing and storing a low-resolution version of the media content on the on-board storage 512 of the media capture device 502 itself. In some of these cases, the simultaneous capture may be performed by separate image sensors or microphones on the media capture device. For example, a media capture device 502 may record a 480p (or lower resolution) video onto the on-board storage 512 while simultaneously uploading a 4K (or whatever the maximum resolution of the media capture device 502 may be) resolution video to the remote storage resource 506. Note that, in some implementations, the simultaneous capture can be performed using the same input component (e.g., image sensor, microphone, etc.) that is capturing the high-resolution media. For example, a high-resolution image or video frame may read every pixel element of every row of a charge-coupled device image sensor, whereas the low-resolution copy may be generated by only reading alternate pixels and rows of the same image sensor. As another example, a low-resolution copy may be generated by capturing audio from the same microphone as is being used to capture high-resolution audio, but only at a lower sample rate.

In other cases, the media capture device 502 may capture and transfer the high-resolution content 504 to the remote storage resource 506, and a remote computing system may be caused to generate a low-resolution copy of the high-resolution content 504. The low-resolution content may then be downloaded to the media capture device 502, or even downloaded to another authorized device (e.g., a personal computer). In still other cases, the media capture device 502 may capture the high-resolution content 504 and create a low-resolution copy from the high-resolution content 504 through software or firmware resident on the media capture device 502.

As noted, in some embodiments, as the high-resolution content 504 is being captured, the high-resolution content 504 is simultaneously streamed to the distributed system 508 of the service provider 510. In this manner, high-resolution content 504 may continue to be recorded long after the native storage capabilities of the media capture device 502 would have been exhausted if the high-resolution content 504 were stored on the media capture device itself 502. For example, a particular mobile phone may record high-resolution video at a rate of 100 megabytes per minute, however if the mobile phone only has 32 gigabytes of on-board storage, the mobile phone may only be able to record 320 minutes of high-resolution video. However, in the present disclosure, the mobile phone may be connected to Wi-Fi and be uploading the video to a remote system simultaneously as it is capturing the video. The memory and/or on-board storage of the mobile device may be used temporarily to buffer the video data before it is uploaded, and, once uploaded, the high-resolution video data may be erased from the mobile phone to allow the resulting freed space to be re-used.

It is further contemplated as within the scope of the present disclosure, that the uploaded video data of the example given above may be downloaded or played from the remote system even before the video capture has been completed and/or the entire video has been uploaded to the remote system. That is, the remote system may maintain the state of the uploaded parts of the video, such that a valid video file may be constructed from the uploaded parts to be downloaded by the user. For example, if a user selects to download or play an incomplete video (e.g., all parts not having been uploaded yet, or video capture and upload still ongoing), the remote system may generate a valid video file from the uploaded components and provide or stream that video file to the requesting user. Furthermore, any edit actions that have been uploaded to the remote system to be applied to the high-resolution video data may be applied to the constructed video file as well.

Note too, that in some implementations, the captured media can be constructed from non-sequential data. For example, the media capture device 502 may upload portions of the high-resolution content 504 in parallel or in various orders, and, if a user selects to download or play the uploaded media, the remote system may construct the media for download from the non-sequential parts it currently has available. That is, in some implementations, gaps in the media may be skipped over, whereas in other implementations, gaps in the media may be filled with blank or default media. For example, if a user selects to play an audio file that is currently missing some non-sequential portions in the uploaded media, an audio file may be generated from the available portions and silence used to fill the missing portions.

In some cases, the media capture device 502 may have completed capture of the high-resolution content 504, but the high-resolution content 504 may not have been fully-uploaded to the remote storage resource 506 when requested by a user. In such cases, the media capture device 502 may provide the remote system with metadata describing the full size of the captured media and the remote system may notify the requesting user that the requested content is not fully uploaded. For example, the media capture device 502 may capture a two-hour twenty-minute video and begin uploading the video data to the remote system. In the example, a user may select to download the video when only two hours of the video data have been uploaded. The remote system may generate the video for download such that, when video playback reaches the end of the two hours, a message may appear on the user's screen stating that "This portion has not been uploaded," (e.g., the viewer must request to view the remaining 20 minutes of video when it is available) or "Click here to view the remainder of the video," with the latter message providing a link to the final 20 minutes of the video data (if available). In some implementations, the remote system may generate the video such that, if the final 20 minutes of the video data is available by the time the user reaches the end of the first two hours in video playback, the video player is directed to automatically obtain and splice the final 20 minutes of the video file into the video playback. In this manner, the viewing user may view the entire video without being aware that the video data was not fully uploaded at the time when playback began.

In addition, as noted, in some embodiments, the media capture device 502 simultaneously stores a low-resolution copy of the media in conjunction with uploading the high-resolution content 504 to the remote storage resource 506. In some embodiments, the low-resolution copy is captured through a separate input (e.g., microphone, image sensor, etc.) than the input capturing the high-resolution content 504. In other embodiments, the low-resolution copy is generated from the high-resolution content 504; e.g., as each frame of a high-resolution video is uploaded to the remote system, a low-resolution frame may be generated from the high-resolution frame and stored on on-board storage 512 of the media capture device 502. In still other embodiments, as the high-resolution content 504 is being uploaded to the remote storage resource 506, a remote computer system of the distributed system 508 is simultaneously generating a low-resolution copy of the high-resolution content 504. The low-resolution copy may be pushed by the remote computer system to the media capture device 502 to be stored on the on-board storage 512. In still other embodiments, the remote computer system generates the low-resolution copy of the high-resolution content 504 only after receiving a signal from the media capture device 502 that the capturing is complete and that the media capture device 502 is now ready to receive the low-resolution copy. In all of the above embodiments, the user can perform edit actions on the low-resolution copy on the media capture device 502 as it becomes available.

In some embodiments, the high-resolution content 504 utilizes (i.e., records to) the on-board storage 512 of the media capture device 502 as it is being captured unless it detects that on-board storage 512 space is at risk of running low. In these embodiments, the high-resolution content 504 can be examined and/or edited directly on the on-board storage 512 by the media capture device 502. However, if the system of the present disclosure determines that the on-board storage 512 may be insufficient, the media capture device 502 may begin uploading the high-resolution content 504 through a network to the remote storage resource 506 on a first-in first-out basis from the on-board storage 512. For example, the media capture device may determine that available on-board storage may be insufficient if available free space decreases below a certain threshold amount or an estimate of available space needed based at least in part on a capture rate and estimated capture time. As the high-resolution content 504 is uploaded, the media capture device 502 may then erase the uploaded media content from the on-board storage 512 to free up available on-board storage space and allow the high-resolution content 504 to be captured for a longer amount of time before the on-board storage 512 space is exhausted. In some embodiments, the high-resolution content 504 is streamed directly to the remote storage resource 506 as soon as it is captured, or buffered briefly and then streamed/uploaded directly to the remote system. These embodiments can thereby allow media capture devices having very limited on-board storage to perform high-resolution media captures for sustained periods.

In many cases, switching between media capture to the on-board storage 512 of the media capture device 502 and media capture uploaded to the remote storage resource 506 may be seamless. For example, the high-resolution content 504 may initially be captured and streamed to the remote storage resource 506, but if a user moves the media capture device 502 out of Wi-Fi (or other wireless network) range, the media capture device 502 may automatically switch to storing the media to the on-board storage 512. Then, when the media capture device 502 detects that it has moved back into Wi-Fi (or other wireless network to which the user is able to connect) range, the media capture device 502 may determine to resume uploading the high-resolution content 504 to the remote storage resource 506. When the media capture device 502 reconnects to the network, the media capture device may resume uploading beginning with transferring the high-resolution content 504 from the on-board storage 512 where it left off prior to losing its Wi-Fi connection. As noted, as the high-resolution content 504 is uploaded from on-board storage to the remote system, the uploaded media content may be erased from the on-board storage 512 to make additional storage space available.

Additionally or alternatively, in some embodiments the media capture device 502 is configured to upload the high-resolution content 504 to an intermediary device, such as via a local Wi-Fi hotspot or Bluetooth, and the intermediary device, in turn, may upload the high-resolution content 504 to the remote storage resource 506. In some of these cases, the media capture device 502 and the intermediary device may both be configured to upload the high-resolution content 504 to the remote storage resource 506, whereas in other cases only the intermediary device may be configured to upload the high-resolution content 504 to the remote storage resource 506. For example, the media capture device 502 may be capturing the high-resolution content 504 and uploading the high-resolution content 504 to the remote storage resource 506 when the media capture device 502 loses its Wi-Fi connection to the distributed system 508. In such a case, the media capture device 502 may be configured to automatically upload the high-resolution content 504 to a local laptop computer system within Wi-Fi range for as long as the media capture device 502 remains unconnected to the distributed system 508. If the local laptop computer system in this example does have a connection to the distributed system 508, such as through a wired Ethernet connection, the local laptop computer system may upload the high-resolution content 504, as received from the media capture device 502, to the remote storage resource 506 until such time as the media capture device 502 is able to reestablish connection to the distributed system 508. Alternatively, the media capture device 502 may be configured to always upload the high-resolution content 504 to the local laptop computer system, and the local laptop computer system may be tasked with uploading the high-resolution content 504 to the distributed system 508.

Note that the intermediary device may be any type of device with suitable storage capacity for storing the high-resolution content 504. For example, a first camera may be configured to offload the high-resolution content 504 to a second camera that is configured to receive the high-resolution content 504 from the first camera. In this this manner, the first camera may utilize available on-board storage of the second camera in conjunction with its own on-board storage for storage the high-resolution content 504. In some embodiments, both cameras may be configured to upload the high-resolution content 504 to the remote storage resource 506 when connection to the remote system is available. In some cases, if the first camera reestablishes connection with the distributed system 508, the first camera may be configured to retrieve the high-resolution content 504 from the second camera so that the first camera can upload the high-resolution content to the remote storage resource 506.

In such embodiments, the media capture device 502 may store an upload pointer that tracks the last known bit of data confirmed to have been successfully uploaded to the remote storage resource 506 (e.g., by receiving an acknowledgement (ACK) from the remote storage resource). As data is uploaded to the remote system (e.g., packet by packet), the upload pointer may be updated to reflect the most recent bit of data confirmed as being successfully uploaded. If the media capture device 502 loses and later regains connection to the remote storage resource 506, the media capture device 502 may begin re-uploading the high-resolution content 504 starting at the position indicated by the upload pointer and ending at the end of the file. In collaborative embodiments, as the high-resolution content 504 is uploaded to the remote storage resource 506, the high-resolution content 504 may be immediately available to be accessed and/or edited. For example, an authorized second party may download, from the remote storage resource 506, a low-resolution copy of the high-resolution content 504 uploaded thus far, or the authorized second party may examine the high-resolution content 504 as it is uploaded to the remote storage resource 506. In some embodiments, media content is segmented as it is recorded and/or uploaded, and the media content may be uploaded in portions. In some of these embodiments, one or more upload pointers are utilized to indicate which portions are next to be uploaded.

Additionally or alternatively, in some embodiments the high-resolution content 504 is recorded to the on-board storage 512 in conjunction with lower-resolution media being uploaded to a remote system. For example, a user may wish to record a high-resolution video, such as in 1080p, onto the media capture device 502, but the user may also wish to simultaneously stream a lower-resolution video (e.g., 480p) to a website or social media site to allow live viewing by others. As with other embodiments, in some embodiments the high-resolution content 504 and the lower-resolution media is captured through separate input devices (e.g., separate microphones, multiple image sensors, etc.) of the media capture device 502. In other embodiments, the lower-resolution media is generated from the high-resolution content 504 either by the media capture device 502 or a remote computing system of the distributed system 508. In cases where battery power consumption may be a concern, in some embodiments, having separate input devices on the media capture device 502 provides a reduction in power consumption over having a single input device on the media capture device 502 and generating the lower-resolution media from the high-resolution content 504. In some implementations, generating the lower-resolution media from the high-resolution content 504 may consume less power than having multiple input devices.

Furthermore, in such embodiments where high-resolution media content is stored on a client device and a low-resolution copy is uploaded to the remote computing system, edit actions may be performed to the local high-resolution media content and applied to the low-resolution copy on the remote computing system. That is, edit actions may be uploaded to the remote computing system to be applied to the low-resolution copy in a similar manner as has been described in the present disclosure for edit actions uploaded to the remote computing system to be applied to high-resolution media. In an example, a user may capture a high-resolution image (e.g., 1080×1024 resolution) with a media capture device, and a low-resolution copy (e.g., 640×480 resolution) may be uploaded to a website or social media site hosted by one or more remote computing devices capable of performing edit actions as described in the present disclosure to allow live viewing by others. As the user makes edits to the high-resolution image on the media capture device or other editing device, the edit actions may be uploaded to the website or social media site to be automatically applied to the low-resolution copy on display for others. In this manner, edits made to high-resolution on a client device may be automatically reflected in the low-resolution copy on the remote computing device.

In some embodiments, multiple media capture devices may be configured to capture media and upload the media to the remote storage resource 506 in synchronization. For example, a first user may be recording an event (e.g., a wedding, sporting event, etc.) with the media capture device 502 and uploading the high-resolution content 504 to the remote storage resource 506. At the same time, a second user may also be recording the event with another media capture device. In some cases, the media captured by both devices will be of the same type (e.g., video), whereas in other cases, the media me different types (e.g., the first user may be capturing video while the second user may be capturing audio). At the remote system, the uploaded media may be time-synchronized by the remote system; that is, the media captured by one or both devices may be stored with information sufficient to synchronize the both sets of captured media with each other. In one example, each media file may be stored with a time-stamp such that the remote system is able to calculate a time offset between the two media files in order to synchronize the media files. In another example, media captured from a first device that begins capturing at a time after media being captured by a second device may be stored with a time offset sufficient to synchronize the media files. As still another example, a frame of video captured by a first device may be tagged as the starting frame of that video capture, and the remote system may tag a corresponding frame in media already captured by the second device as being synchronous with the starting frame of that video capture.

The information sufficient to synchronize both sets of captured media may allow an editing user to record edit actions that affect and/or combine both sets of recorded media without having to manually synchronize the sets of recorded media. For example, an editing user may specify that, at certain points in time, the edited media should switch from one set of media content to another. In such a way, an editing user may be able to produce a video that switches from a first camera angle to a second camera angle, and vice versa. Alternately, a multi-angle view video may be generated from both camera angles such that a viewing user may switch between camera angles as desired. Similarly, an editing user may be able to replace audio content in a video recorded by a first user with a first media capture device with audio content recorded by a second user with the second media capture device, and be able to perform separate edit actions on the first media and/or the second media. Note that any number of sets of media and types of media may be synchronized by the remote server in this manner.

Figure 6:
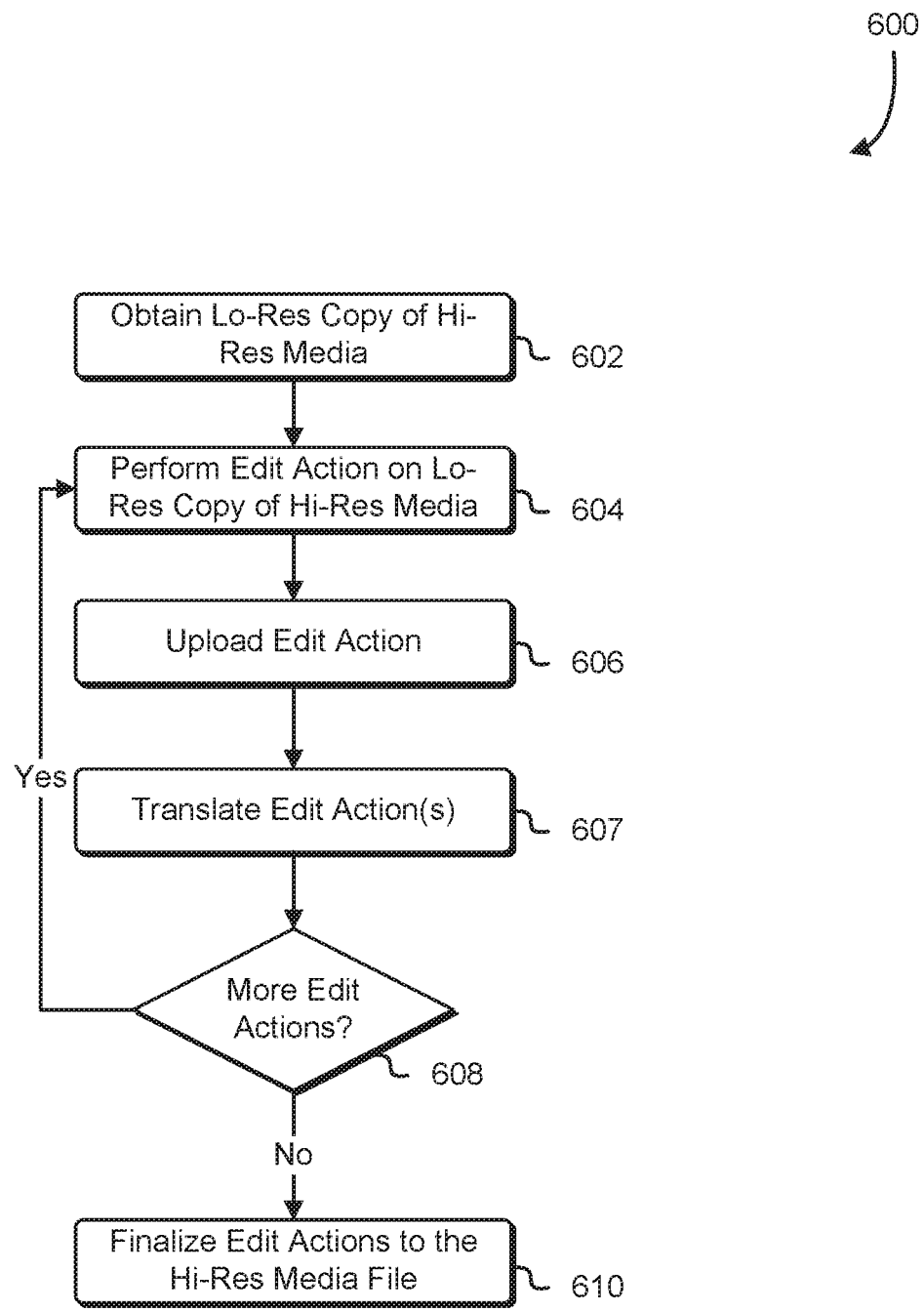
FIG. 6 is a flow chart that illustrates an example of an editing system performing edits to a low-resolution copy of high-resolution media in accordance with an embodiment.

FIG. 6 is a flow chart illustrating an example of a process 600 for performing edit actions on a low-resolution copy of high-resolution media in accordance with various embodiments. The process 600 may be performed by any suitable system such as any of the client devices discussed in conjunction with the client device 102 of FIG. 1, or any electronic client device such as the electronic client device 902 described in conjunction with FIG. 9. The process 600 includes a series of operations wherein an edit action is performed on a low-resolution copy of high-resolution media, uploaded to a remote computer system hosting the high-resolution media, and applied to the high-resolution media.

In 602, the editing system obtains a low-resolution copy of high-resolution media content. As has been described, the high-resolution media content may have been recorded by a media capture device, such as the media capture device 502 of FIG. 5. In some embodiments, the low-resolution copy is generated by the media capture device itself, while in other embodiments, the low-resolution copy is generated by a remote computing system where the high-resolution media content resides. Note that the editing system and the media capture device need not be the same devices. For example, the media capture device may have uploaded the high-resolution content and/or low-resolution copy to the remote computing system, and another system, such as a laptop computer belonging to the user who captured the media content, may be used to download the low-resolution copy and edit the media. In another example, the media capture device may have captured the high-resolution content, and the high-resolution content may have been transferred to another system, such as the aforementioned laptop computer, via a Universal Serial Bus connection or copying the media from a flash memory card.

The low-resolution copy may be resident on the storage of the editing system. In this way, the editing system may perform edit actions on the low-resolution copy before applying those editing actions on the high-resolution content. In 604, a user performs an edit action on the low-resolution copy, such as through a user interface like the interface 200 of FIG. 2. As has been noted, edit actions can include actions such as drawing, painting, pasting, inserting text and/or audio, changing a color palette or color space, warping, blurring, sharpening, and adding various filters and effects.

In 606, the edit action performed in 604 may be uploaded, such as through a wired or wireless network or internet connection, to the remote computing system hosting the high-resolution media file that corresponds to the low-resolution copy. In 607, the remote computing system may translate the set of actions into a set of edit actions applicable to the high-resolution media. For example, edit actions performed to a low-resolution 640×480 copy may not necessarily map to the same coordinates on a high-resolution 2560×1920 media. For example, a coordinate of an edit action performed on the lower-resolution copy may correspond to a region of multiple coordinates in the higher-resolution copy. In such an example, the set of edit actions may be translated to map to correct corresponding locations in the high-resolution media by selecting a corresponding coordinate in the high-resolution media, which may be a corner of a region, a center of the region, a selection of one of several points surrounding a center of the region, or another point, which may be selected using more sophisticated algorithms. As another example, edit actions made to a low-resolution video copy having 24 frames per second (fps) may be translated by the remote computing system to interpolate edit actions to the additional frames of a corresponding high-resolution video media having 48 frames per second. For example, on one frame of the 24-fps copy may have an edit (e.g., a change to a color characteristic) applied to a first degree (e.g., an amount of a change to be made, measured in a manner appropriate to the particular change) and an adjacent frame of the 24-fps copy may have the same edit applied to a second degree. Translation may include determining what degree to apply the edit to the frame between the corresponding frames in the 48-fps copy, which may be an average of the value used to measure the degree or otherwise calculated. If the difference between resolutions is greater, such a determination may be made for multiple frames between corresponding frames (e.g., using interpolation). Note that in some implementations, the editing system may perform the translation to the edit actions and may provide the translated edit actions to the remote computing system. Note that in such implementations, the translation may be performed between operations of 604 and 606.

In 608, the system performing the process 600 determine whether more edit actions have been inputted by the user. Note that an edit action may include undoing or modifying of an edit action already applied to the low-resolution copy. In some cases, the user may signal the system that the user is finished editing by clicking an icon representing a "Save," "Upload," or "Finalize" icon. If the user is not done editing, the system performing the process 600 may return to 604 and apply the next edit action to the low-resolution copy. Otherwise, if the user is done editing the low-resolution copy and wishes to finalize the current edit actions performed thus far, the system performing the process 600 may proceed to 610, whereupon the translated edit actions may be finalized at the remote computing system. Note that, in some examples, "finalize" may refer to saving a list of translated edit actions to a file on the local editing system or to the remote computing system, and in some other examples may further include applying those translated edit actions to the original high-resolution content.

Note that one or more of the operations performed in 602-10 may be performed in various orders and combinations, including in parallel. As an example, an alternative embodiment to process 600, the edit actions of 604 is recorded in memory or to a file on local storage, and the operations of 606 may be performed after the operations of 608. In such an embodiment, only after the edit actions have been approved by the user are the recorded edit actions uploaded to the remote computing system. In this way, the original high-resolution media need not be altered until the user is completely satisfied with the edit actions performed on the low-resolution copy, and additionally, the remote computing system may be spared the cost of having to process edit actions that may be undone or modified later by the user.

In 610, the system performing the process 600 may finalize the edit actions to the high-resolution media file. In some implementations, this may involve applying the uploaded edit actions to the high-resolution content. As noted, is some cases, the edit actions may be stored as an edit action list in an edit action file on the remote computing system. In some cases, the edit actions may be applied to the original high-resolution content itself. In other cases, the edit actions may be performed on the original high-resolution content to produce new, edited content, which may be stored as a separate file. In still other cases, the edit actions may be stored separately from the original high-resolution content, and the remote computing system may be configured to apply the edit actions on-the-fly as the original high-resolution content is streamed or downloaded upon request. In this manner, the original high-resolution content remains unmodified, and the new edited content is only generated when requested.

Figure 7:
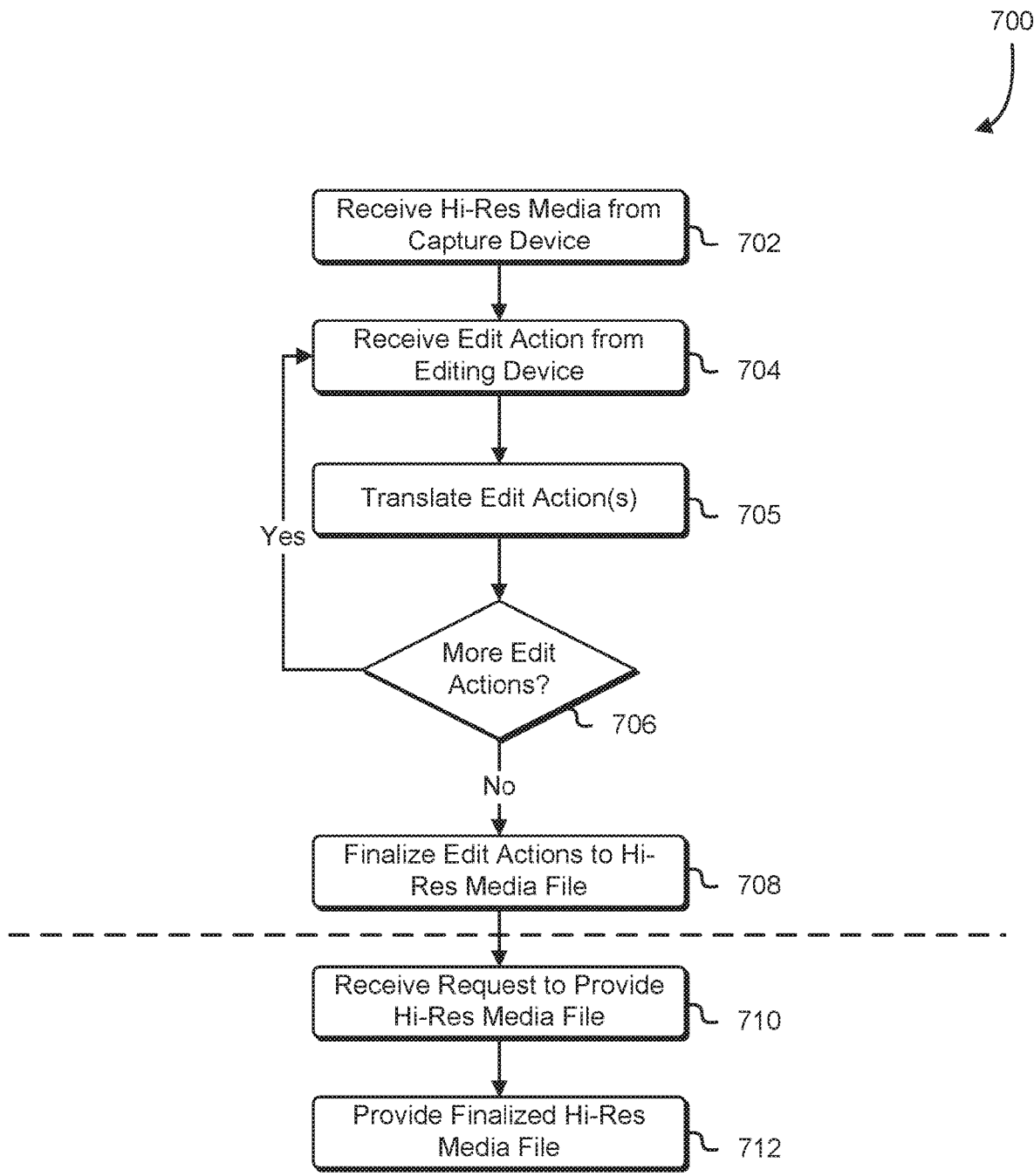
FIG. 7 is a flow chart that illustrates an example of a remote computing system receiving edit actions from an editing system in accordance with an embodiment.

FIG. 7 is a flow chart illustrating an example of a process 700 for applying edit actions obtained from an editing system to high-resolution content obtained from a media capture device in accordance with various embodiments. The process 700 may be performed by any suitable system such as any of the client devices discussed in conjunction with the client device 102 of FIG. 1, or any electronic client device such as the electronic client device 902 described in conjunction with FIG. 9. The process 700 includes a series of operations wherein original high-resolution media content is received, a set of editing actions are obtained and applied to the high-resolution media content, and the newly-edited content is provided to a requestor. In 702, media content may be received from a media capture device. Examples of media content include one or more still of high-resolution images, videos, audio, interactivity content, text, animation, and any combination of the aforementioned content. Note that all of the high-resolution content need not be received before proceeding to other operations in the process 700. For example, a video camcorder may begin streaming video content to the remote system as the video camcorder is capturing the video and the operations of 704-12 may still be performed while the video is streaming and still being captured, as described below. Note that in some embodiments, the high-resolution media need not be received from the capture device, but instead is provided by another device (e.g., uploaded by a user via a laptop computer) or provided on a computer-readable medium, such as a flash memory card or Universal Serial Bus flash drive.

In 704, the system performing the process 700 may receive one or more edit actions, from an editing device, to be performed on the media being received in 702. Note that the editing device need not be the same device as the capture device. For example, in a collaborative embodiment, a first user can be capturing video at a first location and streaming the captured video to the remote computing system as it is captured. Meanwhile, a second user at a second location can be performing edit actions of the present disclosure on a low-resolution copy of the original media, with the low-resolution copy of the original media being provided to the second user soon after it is generated from the original media. In this manner, the second user can edit the media of the first user in nearly real time as it is being captured.

In 705, the remote computing system may translate the set of actions into a set of edit actions applicable to the high-resolution media. For example, edit actions performed to a low-resolution audio copy, where the low-resolution audio copy has a 44.2 kilohertz sample rate and 16-bit bit depth, may need to be translated to be correctly applied to a high-resolution audio media having a 48 kilohertz sample rate and 25-bit bit depth. In such an example, the set of edit actions may be translated to map to correctly apply to corresponding audio locations in the high-resolution media. As another example, edit actions made to a low-resolution copy affecting color, where the low-resolution copy has a different or reduced color space compared to the high-resolution media, may require translation to the color space of the high-resolution media. Examples of color matching methods for color space translations include ColorSync, Adobe CMM, LittleCMS, and ArgyllCMS. Note that in some implementations, the editing device may perform the translation to the edit actions and provide the translated edit actions to the remote computing system.

In 706, the system performing the process 700 determines whether more edit actions are forthcoming from the editing device. For example, in some embodiments, the edit actions (e.g., instructions) are uploaded as soon as applied to the low-resolution copy on the editing device. In such embodiments, the system performing the process 700 may record the set of editing actions in memory, a database, or other storage, until it receives a signal indicating that the edit actions have been approved/finalized. In other embodiments, a set of edit actions are recorded at the editing device, and when they are uploaded to the remote computing system (e.g., in response to a user clicking a "save" icon) the system may presume that the edit actions are approved to be applied to the original content. In still other embodiments, as each edit action is applied to the low-resolution copy on the editing device, the editing system provides the edit action to the remote computing system to be immediately applied to the original content, such that the original content may be edited in parallel with edits to the low-resolution copy.

In 708, the system performing the process 700 may apply the translated edit actions to the original content. As noted, in some embodiments, this causes a new edited content file to be created in order to preserve the integrity of the original content. In some other embodiments, the translated edit actions are simply stored and may be edited later, and edited content may be generated from the original content and the edit actions upon request or on-the-fly. Note too that translated edit actions may be performed on the content before the remote computing system has received all of the captured media. For example, the original content may be being captured in color as it is streamed to the remote computing system, however one of the edit actions may be a command to convert all of the color content to grayscale. The result of such an action may be that the remote computing system automatically converts each frame to grayscale automatically as it is received.

In 710, the system performing the process 700 may receive a request from yet another user or device to view or review the edited media, and in 712, if the requestor is authorized to access the edited media, the system may provide the edited media to the requestor. As an example, a first person may be video recording a football game and streaming the video content to the remote computing system in the manner described for the operations of 702. In parallel, a second person may be editing the video, by inserting, for example, augmented reality "first down" lines into the video on the second person's low-resolution copy.

The edit actions may be recorded as an edit list, and, then, when a third person begins streaming video from the remote computing system, the augmented reality inserts from the edit list may then be applied to the high-resolution video content being streamed to the remote computing system, such that the third person is able to seamlessly view the edited content with the augmented reality inserts while the game is ongoing. In this way, the edit actions may be changed without affecting the original media and the edit actions may be applied to the streamed video content on-the-fly. In some implementations, a viewer may be given a choice whether to view the high-resolution media with the edit actions applied, or with only certain edit actions applied. For example, a user may choose to watch the aforementioned football game without augmented reality overlays, or with only the score overlay applied but not the "first down" lines. Note that the dashed line between 708 and 710 indicates that the operations performed in 710-12 may be performed at any time after the operations performed in 702-08. Note also that one or more of the operations performed in 702-12 may be performed in various orders and combinations, including in parallel.

Figure 8:
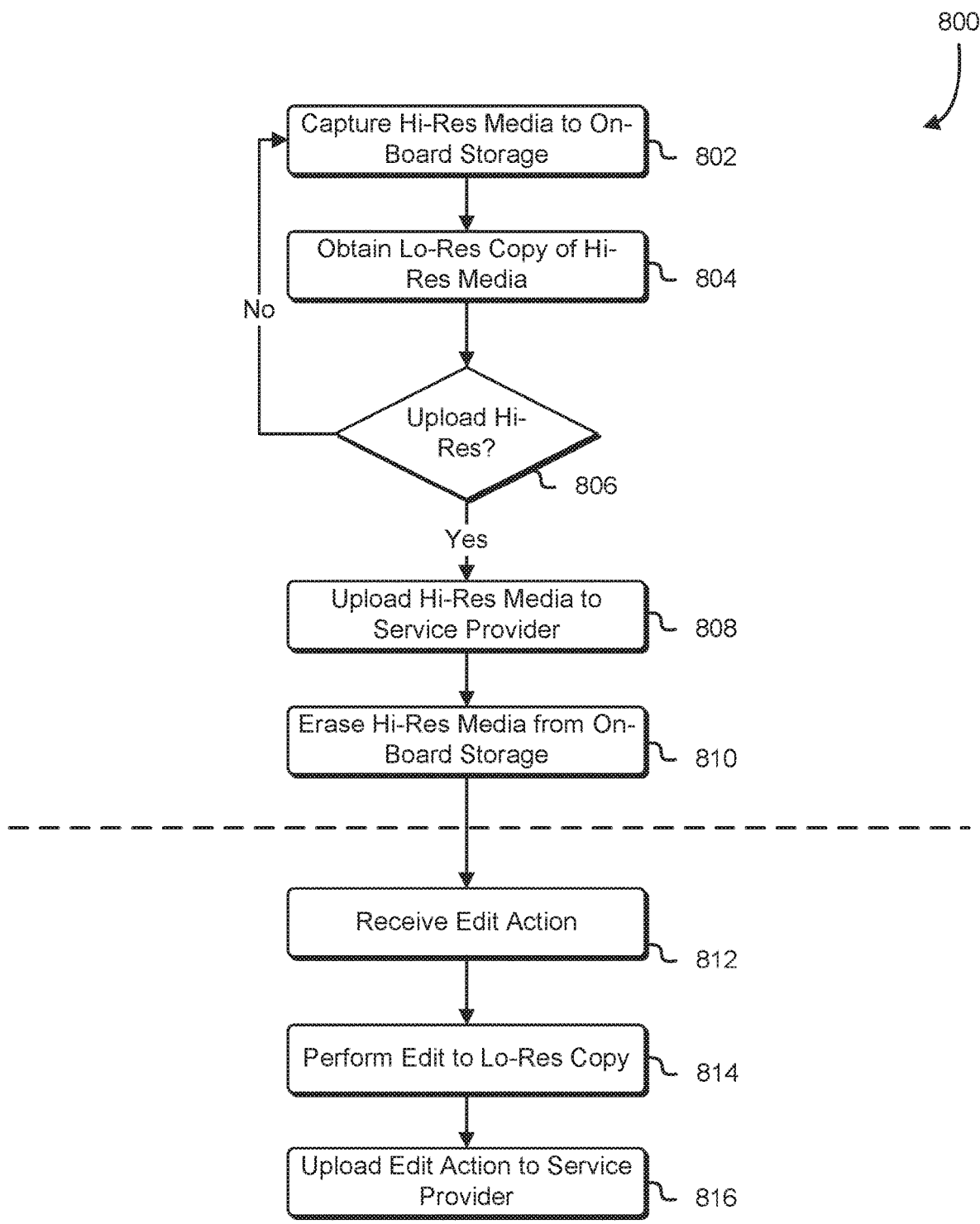
FIG. 8 is a flow chart that illustrates an example of a media capture device obtaining high-resolution media and a low-resolution copy in accordance with an embodiment.

FIG. 8 is a flow chart illustrating an example of a process 800 for capturing high-resolution media and performing edit actions on a low-resolution copy using a media capture device in accordance with various embodiments. The process 800 may be performed by any suitable system such as any of the client devices discussed in conjunction with the client device 102 of FIG. 1, or any electronic client device such as the electronic client device 902 described in conjunction with FIG. 9. The process 800 includes a series of operations wherein high-resolution media is captured and uploaded to a remote computing system, a low resolution copy of the high-resolution media is created, and edit actions are recorded and uploaded to the remote computing system.

In 802, a media capture device, such as a mobile phone with video recording capabilities, begins the capture of high-resolution media content to its local on-board storage. For example, a mobile phone may begin capturing a video of a sporting event, a multitrack recorder may begin recording audio tracks, or a digital camera may capture a scene in one or more still images. Local on-board storage of the media capture device includes persistent and volatile types of storage, such as dynamic random access memory and flash memory, that may be communicatively coupled (e.g., through wires, circuits, and other conductive connections) to a media generating component (e.g., image sensor, microphone, computer system with digital animation software, etc.). In some cases, the entire media capture event may occur before the system performing the process 800 proceeds to 804. For example, an entire four-hour video may be recorded by the media capture device before the low-resolution copy of the video is generated and before any of the video is uploaded to the service provider. In other cases, the media capture event of 802 may still be ongoing even as the system performing the process 800 performs one or more of the operations 804-16, particularly in embodiments where the high-resolution media is being streamed to the service provider as it is captured.

In 804, a low-resolution copy of the high-resolution media capture or being captured is obtained. In cases of video, this may be performed by the media capture device generating a low-resolution copy of each high-resolution video frame as it is captured. In cases of audio, generating the low-resolution copy may involve sampling the received audio at a lower sample rate. In any case, the low-resolution copy may lack detail present in the high-resolution media (e.g., may be 480p rather than 1080p, may have 16-bit color rather than 24-bit color, etc.). In many cases, the low-resolution copy may take up less storage space and consume fewer resources (e.g., processing power, memory, etc.) when rendering, playing, or editing, than would the high-resolution media content.

Note too that the low-resolution copy may be obtained from a variety of sources, depending on the embodiment. In some embodiments, the media capture device itself generates the low-resolution copy from the high-resolution media content as it is captured. In other embodiments, the low-resolution copy is recorded independently from the high-resolution media, such as through a separate image sensor or microphone. In these embodiments, the low-resolution copy and the high-resolution may be captured concurrently; that is, in parallel and at the same time, such that the low-resolution copy and the high-resolution media are synchronized. In still other embodiments, the low-resolution copy is generated by the service provider from the high-resolution media uploaded to the service provider, and downloaded by the media capture device. Note that in some implementations, the operations of 804 may be performed as the high-resolution media is being captured or may be performed at some time after the high-resolution media is captured.

In many cases, the low-resolution copy and the high-resolution media may be synchronized with each other. For example, a low-resolution video frame should have a corresponding high-resolution video frame in its corresponding high-resolution video. Likewise, a low-resolution audio sample should have a corresponding sample in the high-resolution audio file. Note that in some cases, the high-resolution media may have additional detail not found in the low-resolution copy. For example, where a high-resolution video was captured at a higher frame rate than the low-resolution copy, the high-resolution video may have additional video frames not present in the low-resolution copy. For editing purposes, when the low-resolution media is edited, the system of the present disclosure may determine a range of the captured media corresponding to or affected by the edit action. For example, if a high-resolution video were captured at 48 frames per second and the low-resolution video is generated at 24 frames per second, an edit action performed to one of the low-resolution video frames may be determined to affect the corresponding frame in the high-resolution video and the preceding or following high-resolution video frame.

In some embodiments, other devices obtain the low-resolution copy in addition to or as an alternative to the media capture device obtaining the low-resolution copy. For example, a user may download the low-resolution copy from the remote computing device to a tablet personal computer and may perform edit actions on the low-resolution copy using the tablet personal computer.

In 806, the system performing the process 800 determines whether to upload the high-resolution media content to a remote computing system of the service provider. In some cases, the high-resolution content may be buffered in local storage of the media capture device and streamed/uploaded to the remote computing system as soon as the media capture device is able to do so. In many implementations, the media capture device can use a wireless network, such as a cellular phone network or Wi-Fi, to upload the high-resolution media. In some cases, the media capture device may be offline during some or the entire media capture event (e.g., the user moves the device out of Wi-Fi range) and the media capture device may determine whether to upload the high-resolution media as soon as the media capture device is reconnected to a network. In even other cases, the media capture device may upload the high-resolution media if it determines that available on-board storage is at risk of being insufficient to capture the entire high-resolution content. An example of how the determination that available on-board storage may be insufficient is to determine that an amount of available space has decreased below a threshold. Another example of how the determination that available on-board storage may be insufficient is to determine that the amount of recorded high-resolution media has exceeded a threshold. Yet another example of how the determination that available on-board storage may be insufficient is to determine that available on-board storage may be insufficient based on the result of a heuristic that compares available space with an estimated amount of space needed based on media capture rate and time.

In other cases, the media capture device may upload the high-resolution content only if the user/operator of the media capture device has instructed the media capture device to do so. In still other cases, the high-resolution media may be transferred to another device, such as copying the high-resolution media through a Universal Serial Bus cable to a laptop computer, and the high-resolution media may be uploaded to the remote computer from the other device. If the system performing the process 800 determines not to upload high-resolution media content from on-board storage to the remote computing system at this time, it may return to 802 to continue capturing high-resolution media or begin capturing different high-resolution media. However, as noted, in some cases the capture of the high-resolution media may continue during some or all of the operations of 804-16.

Otherwise, if the system performing the process 800 determines to upload the high-resolution media, in 808 it does so. As noted, in some cases this upload may include an upload of one or more media files to a remote computing system, while in other cases this upload may include streaming the media to the remote computing system. As high-resolution media content is uploaded from the media capture device, in 810, the uploaded high-resolution media content may be erased from the on-board storage to allow the freed space to be used for future storage. In some embodiments, the media capture device captures the high-resolution media in a first-in first-out buffer and erase media from the buffer when the media is confirmed to have been received by the remote computing device. In other cases, the high-resolution media may be erased only after the media capture event has ended and the corresponding write to the high-resolution file on the on-board storage closed. In still other implementations, the high-resolution media may be captured in one or more chunks (e.g., separate files which are fragments of the entire media capture), and, as each chunk is uploaded to the remote computing system, the uploaded chunk may be erased.

In 812, a user may cause an edit action to be performed on the low-resolution copy of the high-resolution media. Note that the dashed line between 810 and 812 indicates that the operations performed in 812-16 may be performed at any time after the operations performed in 802-10. Example edit actions include cropping, blurring, changing a color space, inserting graphic objects, and adding audio effects. A user interface for capturing user input, recording edit actions, and applying the edit actions to the low-resolution copy may be resident on the media capture device or other editing device. In some implementations, the user interface may be integrated into the firmware of the media capture device (e.g., camera, mobile phone, etc.). In other implementations, the user interface may be part of a software package executing on a different system, such as a laptop or tablet device, that obtains the low-resolution copy from the service provider. An example of such a user interface is the interface 200 of FIG. 2.

In 814, the edit action specified by the user may be applied to (i.e., caused to affect) the low-resolution copy. In this manner, the user may be able to ascertain how the edit action will affect the high-resolution media by observing how the edit action affects the low-resolution copy. In some cases, the user may be unaware that he/she is editing the low-resolution copy, as it may not be apparent from the output characteristics of the media capture device (e.g., small screen, low fidelity speakers, etc.) that the low-resolution copy and the high-resolution media are separate.

Note that, in some implementations, the edit actions may be determined and uploaded to the remote computing system by a separate (i.e., intermediary) device rather than the client device. For example, the low-resolution image may be stored on an intermediate computing system in communication with the editing device. Software running on the intermediate computing system and/or the editing device may cause the low-resolution image to be displayed on a screen of the editing device, and may cause user input to be communicated to the intermediate computing system. The software of the intermediate computing system may translate the user input into editing actions to be performed on the low-resolution image and to be uploaded to the remote computing system hosting the original high-resolution image. In this manner, the editing device may be utilized to perform editing actions on the high-resolution media without either the high-resolution media or the low-resolution copy being persistently stored on the editing device.

Finally, in 816, the edit actions may be uploaded to the remote computing system of the service provider. In some cases, the edit actions may be uploaded and applied to the high-resolution media on the remote computing system as soon as they are applied to the low-resolution copy or as soon as the editing system is able to communicate the edit actions to the remote computing system. In other cases, the edit actions may be recorded and uploaded in a batch to the remote computing system to be applied to the high-resolution media, such as in response to the user selecting a "Save" option on a user interface of the editing device. Note that one or more of the operations performed in 802-16 may be performed in various orders and combinations, including in parallel.

Unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
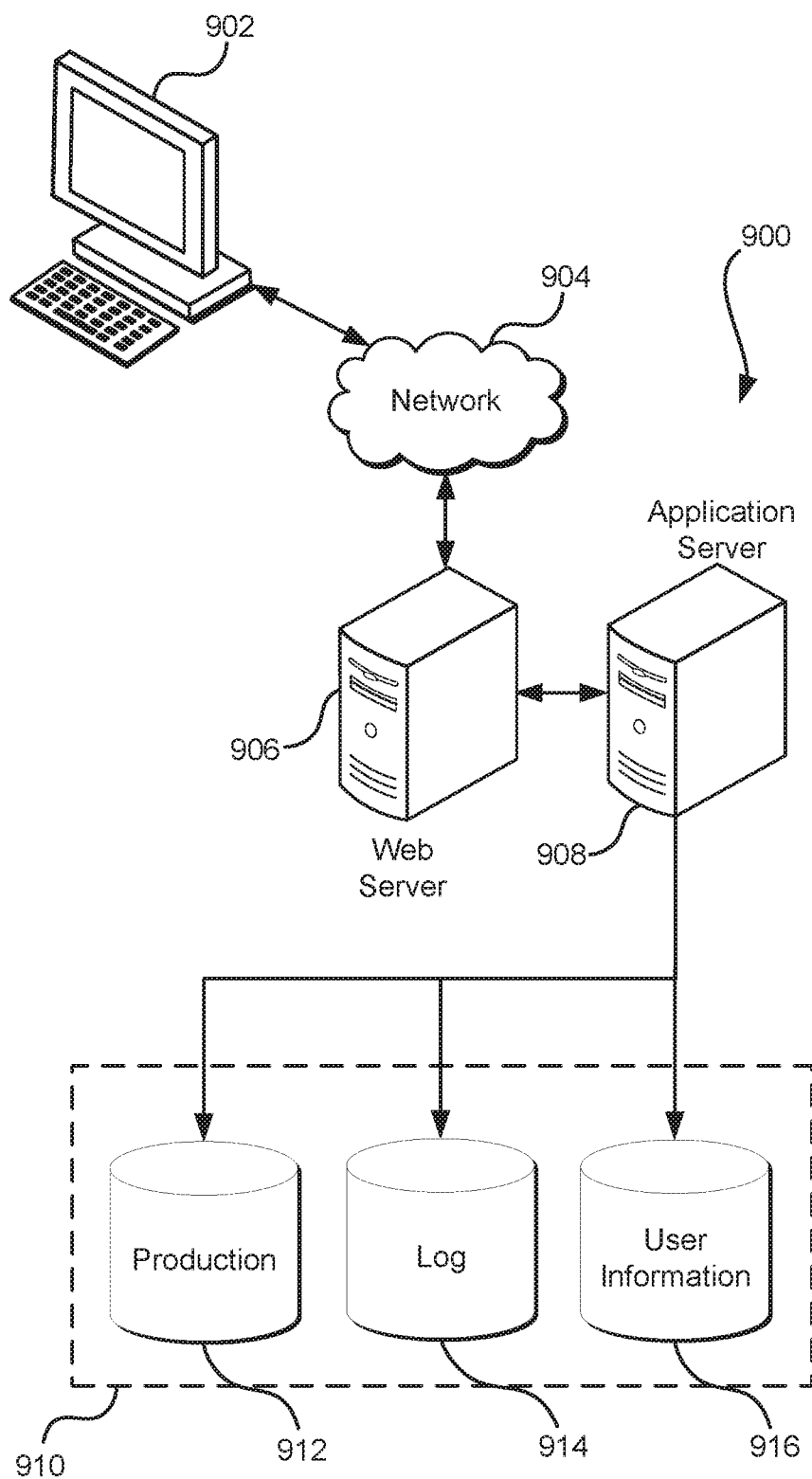
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the electronic client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   obtaining, through a network, media content of a first resolution from a media capture device;
   storing the media content of the first resolution in a data store of a service provider;
   obtaining, through the network, a set of edit actions from an editing device, wherein the set of edit actions were previously approximated on media content of a second resolution by the editing device, wherein the second resolution is of lower resolution than the first resolution, the set of edit actions including a set of edit seeds, where members of the set of edit seeds include a set of properties associated with the members and indicate an edit action of the set of edit actions applied to a first portion of media content having at least one property of the set of properties;

receiving, through the network, a request for a second portion of the media content of the first resolution from a requesting device;

computing, in response to the request, a set of translated edit actions for the second portion of the media content of the first resolution based at least in part on a set of threshold ranges of the set of properties of the members of the set of edit seeds;

applying the set of translated edit actions to the second portion of the media content of the first resolution to produce edited media content; and providing, through the network, the edited media content to the requesting device.

2. The computer-implemented method of claim 1, wherein obtaining the media content of the first resolution comprises obtaining a continuous stream of data corresponding to media having the first resolution, and applying the set of edit actions to the media content of the first resolution to the edited media content comprises applying the set of edit actions to the continuous stream of data to produce a continuous edited stream of data.

3. The computer-implemented method of claim 1, wherein the editing device and the media capture device are the same device and the first portion of the media content and the second portion of the media content correspond to the same.

4. The computer-implemented method of claim 1, wherein:
the media capture device is operated by a first user capturing the media content of the first resolution at a first location; and
the editing device is operated by a second user performing the set of edit actions on the media content of the second resolution at a second location, wherein the second location is remote from the first location.

5. The computer-implemented method of claim 1, further comprising:
receiving a request for a select portion of the media content of the first resolution from the editing device, wherein the select portion is smaller than the media content of the first resolution, and wherein the select portion includes details not present in a third portion of the media content of the second resolution that corresponds to the select portion of the media content of the first resolution; and
providing, through the network, the select portion of the media content to the editing device.

6. A non-transitory computer-readable storage medium storing thereon executable instructions that, as a result of being executed by one or more processors of a computer system, cause the computer system to at least:
obtain media content of a first resolution from a media capture device;
store the media content of the first resolution in a data store;
obtain a set of edit actions, wherein the set of edit actions were previously applied to media content of a second resolution and include one or more edit seeds, wherein the media content of the second resolution is a copy of the media content of the first resolution but at a different resolution than the first resolution, wherein individual edit seeds of the one or more edit seeds have a set of associated properties and a set of associated edit actions applied to media content of the second resolution including an associated property of the set of associated properties; and
produce, in response to a request, edited media content by applying the set of edit actions to at least a portion of the media content of the first resolution by at least:
finding other portions of the media content of the first resolution that have property values within a threshold range of the associated property of the set of associated properties of the individual edit seeds; and
applying the individual edit seeds to the other portions of the media content of the first resolution.

7. The non-transitory computer-readable storage medium of claim 6, wherein the instructions further comprise instructions that, as a result of being executed by the one or more processors, cause the computer system to at least:
generate the media content of the second resolution from the media content of the first resolution; and
provide the media content of the second resolution to an editing device.

8. The non-transitory computer-readable storage medium of claim 6, wherein the media content of the first resolution from the media capture device is first media content of the first resolution from a first media capture device and the instructions further comprise instructions that, as a result of being executed by the one or more processors, cause the computer system to at least:
obtain second media content of a third resolution from a second media capture device;
apply the set of edit actions to produce the edited media content includes combining at least a portion of the first media content with at least a portion of the second media content; and
wherein the second media content of the third resolution is stored in the data store with information sufficient to synchronize the second media content with the first media content.

9. The non-transitory computer-readable storage medium of claim 6, wherein the instructions further comprise instructions that, as a result of being executed by the one or more processors, cause the computer system to at least:
receive the request from a requesting device to access the edited media content; and
provide the edited media to the requesting device.

10. The non-transitory computer-readable storage medium of claim 6, wherein the instructions further comprise instructions that, as a result of being executed by the one or more processors, cause the computer system to at least:
receive a request from an editing device for media content of a third resolution, from an editing device, wherein the media content of the third resolution corresponds to at least the portion of the media content of the second resolution but has higher fidelity than a corresponding portion of the media content of the second resolution.

11. The non-transitory computer-readable storage medium of claim 6, wherein the instructions that cause the computer system to obtain the set of edit actions further include instructions that, as a result of being executed by the one or more processors, cause the computer system to at least:
determine that at least one edit action of the set of edit actions requires further review;

produce pending edited media by applying the at least one edit action to the portion of the media content of the first resolution;

provide the pending edited media with a confirmation request to apply the at least one edit action to at least the portion of the media content of the first resolution; and based at least in part on a response to the confirmation request, produce the edited media content by at least applying the at least one edit action to at least the portion of the media content of the first resolution.

12. A system, comprising:

one or more processors; and memory including executable instructions that, as a result of being executed by the one or more processors, cause the system to at least:

obtain media of a first resolution from a computing device;

store the media of the first resolution in a data store;

obtain a set of edit actions including a set of edit seeds, a first edit seed of the set of edit seeds having associated a set of properties and indicating at least one edit action of the set of edit actions to apply to a portion of the media including at least one property of the set of properties, wherein the set of edit actions were previously applied to media of a second resolution, wherein the media of the second resolution is a copy of the media of the first resolution but at a different resolution than the first resolution; and produce edited media content by applying the set of edit actions to the portion of the media of the first resolution by at least:

finding a first portion of the media of the first resolution that has a value within a threshold of the set of properties of the first edit seed; and applying the first edit seed to the first portion of the media of the first resolution.

13. The system of claim 12, wherein the media of the second resolution is generated by the computing device from the media of the first resolution.

14. The system of claim 12, wherein the executable instructions further include instructions that cause the system to at least:

compute a set of translated edit actions for at least the portion of the media of the first resolution based at least in part on the set of edit actions; and apply the set of translated edit actions to the portion of the media of the first resolution to produce edited media content.

15. The system of claim 12, wherein the set of edit actions are derived from one or more edit actions made to the media of a third resolution by the computing device.

16. The system of claim 12, wherein the executable instructions that cause the system to provide the edited media content include instructions that cause the system to provide the edited media content as streaming media.

17. The system of claim 12, wherein the executable instructions that cause the system to obtain the media of the first resolution, further include instructions that cause the system to receive the media of the first resolution as a continuous stream.

18. The system of claim 12, wherein local storage of the computing device is of insufficient size to store the media of the first resolution.

19. The system of claim 12, wherein:

the media of the first resolution is captured by a media capture device at a first location; and the computing device from which the media of the first resolution is obtained is an intermediary device between the media capture device and the system, the intermediary device storing the media of the first resolution at a second location remote from the first location.

20. The system of claim 19, wherein the media of the first resolution is obtained from the computing device due to lack of a network connection between the media capture device and the system.

21. The non-transitory computer-readable storage medium of claim 6, wherein the set of edit actions is obtained from a user device provided with the media content at the second resolution based at least in part on an attribute of the user device or a network connection between the computer system and the user device.

* * * * *